US008157637B2

(12) United States Patent
Lind et al.

(10) Patent No.: US 8,157,637 B2

(45) Date of Patent: Apr. 17, 2012

(54) APPARATUS AND METHOD FOR MAPPING MULTIPLE BINGO GAME RESULTS TO A COMMON DISPLAY

(75) Inventors: Clifton E. Lind, Austin, TX (US); Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 1081 days.

(21) Appl. No.: 11/927,437

(22) Filed: Oct. 29, 2007

(65) Prior Publication Data

US 2008/0058093 A1 Mar. 6, 2008

Related U.S. Application Data

(63) Continuation of application No. 11/044,406, filed on Jan. 27, 2005, now Pat. No. 7,708,633, which is a continuation-in-part of application No. 10/456,721, filed on Jun. 6, 2003, now abandoned.

(60) Provisional application No. 60/444,503, filed on Feb. 3, 2003.

(51) Int. Cl.
*A63F 13/00* (2006.01)

(52) U.S. Cl. ................. 463/19; 463/16; 463/20; 463/25

(58) Field of Classification Search .................... 463/16, 463/19, 20, 25
See application file for complete search history.

(56) References Cited

U.S. PATENT DOCUMENTS

| | | | | |
|---|---|---|---|---|
| 4,455,025 | A * | 6/1984 | Itkis | 273/237 |
| 5,393,057 | A | 2/1995 | Marnell, II | |
| 5,639,088 | A * | 6/1997 | Schneider et al. | 273/138.2 |
| 5,857,911 | A | 1/1999 | Fioretti | |
| 5,935,002 | A | 8/1999 | Falciglia | |
| 6,012,984 | A | 1/2000 | Roseman | |
| 6,159,095 | A | 12/2000 | Frohm et al. | |
| 6,186,892 | B1 | 2/2001 | Frank et al. | |
| 6,203,433 | B1 | 3/2001 | Kume | |
| 6,280,325 | B1 | 8/2001 | Fisk | |
| 6,398,645 | B1 | 6/2002 | Yoseloff | |
| 6,428,413 | B1 | 8/2002 | Carlson | |
| 6,530,840 | B1 | 3/2003 | Cuomo et al. | |
| 6,537,150 | B1 | 3/2003 | Luciano et al. | |
| 6,569,017 | B2 * | 5/2003 | Enzminger et al. | 463/19 |
| 6,581,935 | B1 | 6/2003 | Odom | |
| 6,585,590 | B2 | 7/2003 | Malone | |
| 6,604,997 | B2 | 8/2003 | Saidakovsky et al. | |
| 6,656,040 | B1 | 12/2003 | Brosnan et al. | |

(Continued)

OTHER PUBLICATIONS

"EverGreen and Tooty Frooty Bingo. Same Game, Two Name." Brochure, 2 pages, Dec. 1998.

*Primary Examiner* — James S McClellan

(74) *Attorney, Agent, or Firm* — Nathan H. Calvert; Russell D. Culbertson; The Culbertson Group, P.C.

(57) ABSTRACT

Apparatus and methods are described for presenting multiple bingo game results on a common display. A bingo game player may participate in a number of bingo games and obtain results for each of those games. These bingo game results are combined to amount to a cumulative result, and a common graphic display is produced that is representative of the cumulative result. The common graphic display is then shown to the player on the display device of a particular electronic player station.

8 Claims, 13 Drawing Sheets

U.S. PATENT DOCUMENTS

| | | | | |
|---|---|---|---|---|
| 6,729,959 | B1 | 5/2004 | Moore et al. | |
| 6,743,102 | B1 | 6/2004 | Fiechter et al. | |
| 6,780,108 | B1 * | 8/2004 | Luciano et al. | 463/19 |
| 6,860,810 | B2 | 3/2005 | Cannon et al. | |
| 7,059,966 | B2 | 6/2006 | Luciano, Jr. et al. | |
| 2001/0031660 | A1 | 10/2001 | Wilk et al. | |
| 2002/0094859 | A1 | 7/2002 | Hirsch et al. | |
| 2002/0094860 | A1 | 7/2002 | Itkis et al. | |
| 2002/0132661 | A1 | 9/2002 | Lind et al. | |
| 2002/0132666 | A1 | 9/2002 | Lind et al. | |
| 2002/0177478 | A1 | 11/2002 | Glasson et al. | |
| 2003/0045345 | A1 * | 3/2003 | Berman | 463/20 |
| 2003/0064772 | A1 | 4/2003 | Tempest et al. | |
| 2004/0009811 | A1 | 1/2004 | Torango | |
| 2004/0048647 | A1 | 3/2004 | Lind et al. | |
| 2004/0152510 | A1 | 8/2004 | Herrmann et al. | |

* cited by examiner

APPARATUS AND METHOD FOR MAPPING MULTIPLE BINGO GAME RESULTS TO A COMMON DISPLAY

CROSS-REFERENCE TO RELATED APPLICATIONS

This application is a continuation of the U.S. patent application Ser. No. 11/044,406 filed Jan. 27, 2005, now U.S. Pat. No. 7,708,633 and entitled "Apparatus and Method for Mapping Multiple Bingo Game Results to a Common Display," which is a continuation-in-part of the U.S. patent application Ser. No. 10/456,721 filed Jun. 6, 2003, now abandoned and entitled "Method, System, and Program Product for Conducting Multiple Concurrent Bingo-Type Games," which claims the benefit of U.S. Provisional Patent Application Ser. No. 60/444,503 filed Feb. 3, 2003 and entitled "Rapid Play Electronic Bingo Gaming System." The Applicants claim the benefit of the above-identified non-provisional patent applications under 35 U.S.C. §120, and claim the benefit of the provisional application under 35 U.S.C. §119(e). The entire content of each of these applications is incorporated herein by this reference.

TECHNICAL FIELD OF THE INVENTION

This invention relates to electronic gaming systems that enable players to rapidly participate in multiple bingo games. More particularly, the invention is directed to apparatus and methods that enhance a player's bingo game play experience and increase overall player participation in bingo games by rapidly displaying the results of multiple bingo games to a player.

BACKGROUND OF THE INVENTION

The game referred to generally as "bingo" is played with predetermined bingo cards having designations, such as numbers, letters, or other symbols, randomly arranged in a grid or other layout on a bingo card. The locations of such designations on a bingo card are sometimes referred to as spots or locations. Bingo cards may be physically printed on paper or another suitable material, or may be represented by a data structure that defines the various locations and the designations associated with the locations. In a traditional bingo game sequence, a number of predetermined bingo cards are put in play for a particular game. After the sale of bingo cards is closed for a given game, designations are randomly selected from a pool of available designations, such as by drawing marked balls from a tumbler. The selected designations are then matched to the designations on each bingo card that is in play for the game. This matching, which is commonly referred to as daubing the bingo card, results in an individual pattern of matched spots for each card. In traditional bingo games daubing was done manually by the player holding a bingo card. If the player's daubing indicated the bingo card had a game ending pattern, the player would announce the win or "bingo" and the card was again daubed by a game administrator in order to verify the game ending pattern. More recent bingo game systems automatically check for game ending patterns on a bingo card as designations are randomly selected for a game. This automated daubing may be in lieu of or in addition to daubing by the player. Regardless of how the bingo cards in play for a game are daubed, the first bingo card that is daubed in some predefined way is considered a winning bingo card for the game.

Although traditional paper bingo games remain popular, the speed with which such traditional games are played is often an issue among today's players, who are increasingly accustomed to more fast-paced entertainment. That is, certain steps in the traditional paper bingo game are relatively time consuming. These include time allotted for bingo card purchasing (the buy-in period), followed by a period for drawing a sequence of balls, for which there is an announcement of each individual designation that is drawn, followed by a period to allow players to manually daub their bingo card or cards, and then a time for winner verification. The time required to play a traditional bingo game tends to limit player excitement and satisfaction.

Various systems have been developed to aid players in playing bingo games and to enhance player participation in the games. Some bingo gaming systems allow players to participate in bingo games through electronic player stations, and may dispense with the cumbersome distribution of paper bingo cards. Some bingo gaming systems allow players at different gaming facilities, which may be spaced apart over a large geographic area, to participate in bingo games through electronic player stations maintained at the various gaming facilities. These bingo gaming systems may greatly increase player participation in bingo games.

Electronic bingo systems may conduct bingo games relatively quickly in comparison to traditional paper bingo games, and allow the players to receive results very quickly. The speed with which bingo game results are returned to the players and other aspects of electronic bingo gaming systems provide a great deal of flexibility in presenting the results to the players. However, there remains a need to increase player participation in electronically implemented bingo gaming systems and to further decrease the time required to play bingo games.

SUMMARY OF THE INVENTION

The present invention provides apparatus and methods for presenting multiple bingo game results on a common display. According to the invention, a bingo game player may participate in a number of bingo games and obtain a respective bingo game result for each of those games. Instead of displaying each different bingo game result on a separate display, the present invention includes producing a common graphic display that presents two or more bingo game results simultaneously. As used in this disclosure and the accompanying claims, the designation "common graphic display" refers to a graphic presentation that shows two or more bingo game results in a single graphic representation such as, for example, a representation of a number of reels for a reel-type game (slot machine).

One preferred method according to the present invention includes identifying a respective bingo game result for each of a number of respective bingo game play requests. These respective bingo game results combine to amount to a cumulative result for the number of bingo game play requests. The method also includes producing a common graphic display representative of the cumulative result for the number of bingo game plays. This method gives players the opportunity to participate in multiple bingo games simultaneously and receive the results in a single presentation. Consequently, players are able to participate in more bingo games in a given period of time. In addition, this method enhances a player's bingo gaming experience by decreasing the time needed to display multiple bingo game results, since players only have to view the common graphic display and need not wait for a sequence of individual bingo game result presentations.

An apparatus according to the present invention preferably includes a bingo game processor for identifying a respective bingo game result for each of the bingo game plays made by a player. A result display engine receives these individual bingo game results and defines a common graphic display that represents or shows all of those results on a common graphic display at a suitable display device. Some preferred forms of the present invention may also include a display controller and perhaps other processing elements at the location of the display device to direct the display device to produce the graphic images required by the common graphic display defined by the result display engine.

These and other advantages and features of the invention will be apparent from the following description of the preferred embodiments, considered along with the accompanying drawings.

DESCRIPTION OF PREFERRED EMBODIMENTS

The present invention may be used to provide a common graphic display for multiple bingo game results in many different types of bingo gaming systems. The following description of the present invention will be made in reference to a particular bingo gaming system disclosed fully in U.S. patent application Ser. No. 10/456,721 entitled "Method, System, and Program Product for Conducting Multiple Concurrent Bingo-Type Games," which has been incorporated in this application by reference above. However, it should be noted that the invention is not limited to this particular bingo gaming system. Rather, the invention may be used in connection with any bingo gaming system utilizing an electronic player station to present results to a bingo game participant.

Figure 1:
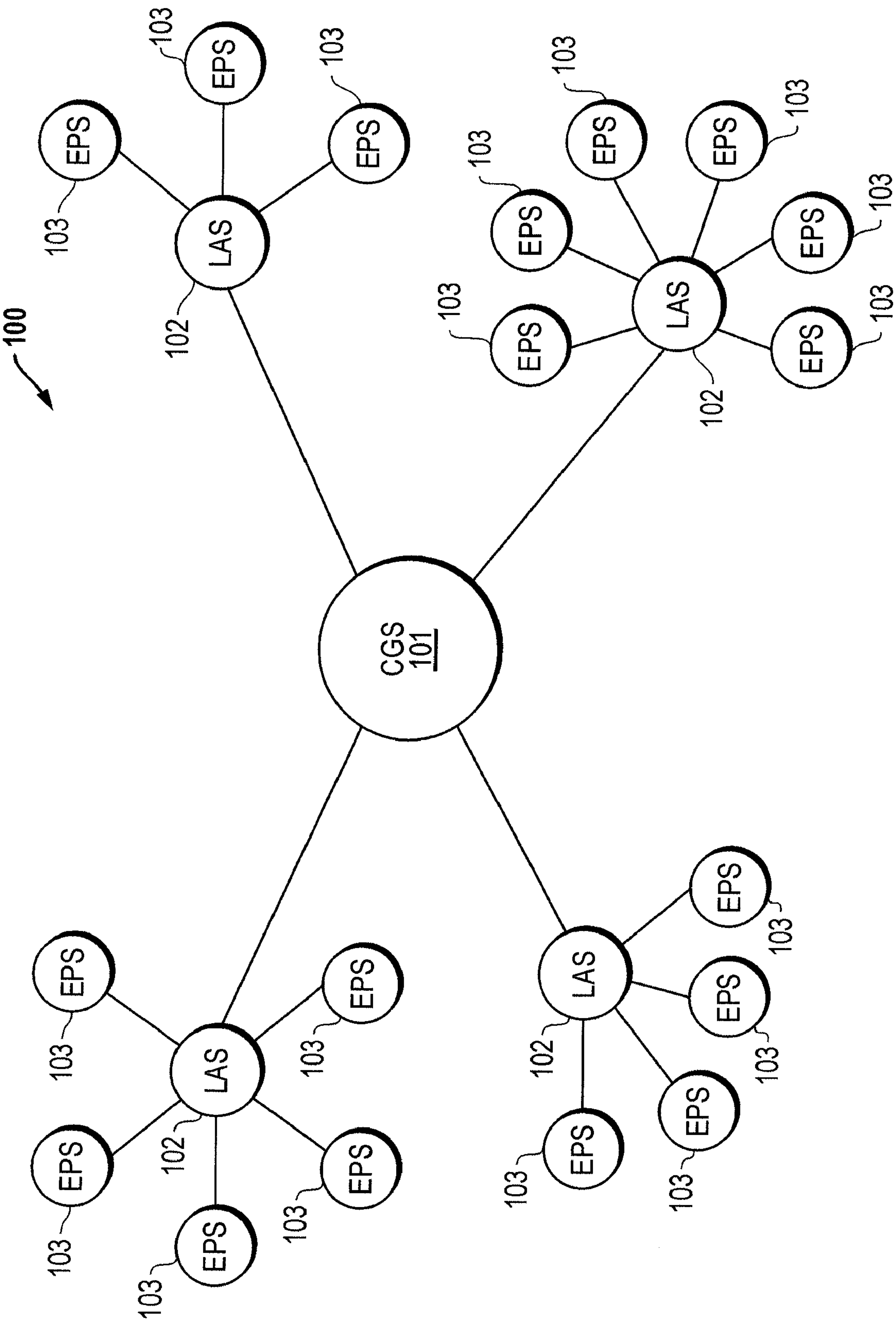
FIG. 1 is a high level diagrammatic representation of a bingo gaming system embodying the principles of the present invention.

The gaming system 100 shown in FIG. 1 includes a central game server (CGS) 101 that cooperates with a number of other components to enable bingo players, preferably at many different remote gaming sites, to participate in bingo games. Each gaming site includes a local area server (LAS) 102 and a number of electronic player stations (EPSs) 103. As will be discussed in detail below, in the normal operation of gaming system 100, a player at any EPS 103 in the system may participate in a given bingo game with players at any other EPSs 103 in the system. Thus, players at different gaming facilities may be grouped together for a given bingo game administered through system 100. Grouping together players from different gaming facilities for the play of a bingo game allows different bingo games to be played rapidly and minimizes the time that players must wait to receive their bingo game results.

The invention includes an arrangement for grouping players and/or game play requests for the play of a single bingo game to facilitate rapid play. This grouping includes limiting the number of players and/or game play requests included in a bingo game to reduce the time required to play the game. System 100 reduces the time between a game play request at one of the EPSs 103 and the return of bingo game results to the respective EPS sufficiently to allow a great deal of flexibility in how results in the bingo game are displayed to the player. In particular, the bingo game results may be displayed in some manner unrelated to bingo. For example, the bingo game results may be mapped to a display traditionally associated with a reel-type game (slot machine), to a display relating to a card game, or to a display showing a race such as a horse or dog race, for example. Preferred techniques for mapping bingo game results to displays associated with games or contests unrelated to bingo are described in U.S. Patent Application Publication No. 2002/0132661 A1, entitled "Method, Apparatus, and Program Product for Presenting Results in a Bingo-Type Game." The entire content of this publication is incorporated in this application by this reference.

System 100 rapidly groups players and/or game play requests and starts one game after another so that multiple games may be in play at any given time. That is, once a first group of players or game play requests has been assigned to a bingo game offered through system 100, the system proceeds to simultaneously administer a bingo game for the first group of players or game play requests and also begin grouping players or game play requests for a next bingo game. System 100 does not necessarily wait for one bingo game to be completed before starting to collect players or game play requests for, and actually beginning play in, the next bingo game. The number of players or game play requests grouped for the play of bingo games according to the present invention may be limited to reduce the time required for grouping. For example, each bingo game offered through gaming system 100 shown in FIG. 1 may be limited to between 2 to 20 players or game play requests, with the preferred number for any given game being from 10 to 15. Where system 100 includes numerous EPSs 103 at the various remote locations, on the order of several thousand EPSs for example, hundreds of individual bingo games may be in progress at any given time through the gaming system. Furthermore, results for a number of different bingo games may become available in a very short time frame. The time frame in which multiple bingo game results may become available for a given player may be so short that the results appear to become available simultaneously.

Regardless of the rapid play facilitated by system 100 and regardless of the manner in which the bingo game results are displayed, the underlying game remains a standard bingo game played in the traditional sequence of play for bingo games. That is, each player obtains or is assigned a bingo card or bingo card representation, all bingo cards in play in the game are daubed or checked for matches with a randomly generated sequence of designations (for example, designations produced in a ball draw or produced by a random number generator), and the first card in the game to match the sequence of designations to produce the game ending pattern wins the bingo game. Additional prizes may be awarded for other patterns that may be produced in the course of the bingo game. The mapping of different prizes to various bingo patterns that may be produced in the course of a bingo game in system 100 may be accomplished as described in U.S. Pat. No. 6,569,017 B2, entitled "Method for Assigning Prizes in Bingo-Type Games" or U.S. Patent Application Publication No. 2004/0048647 A1, entitled "Prize Assignment Method and Program Product for Bingo-Type Games." The entire content of each of these documents is incorporated herein by this reference.

Figure 2:
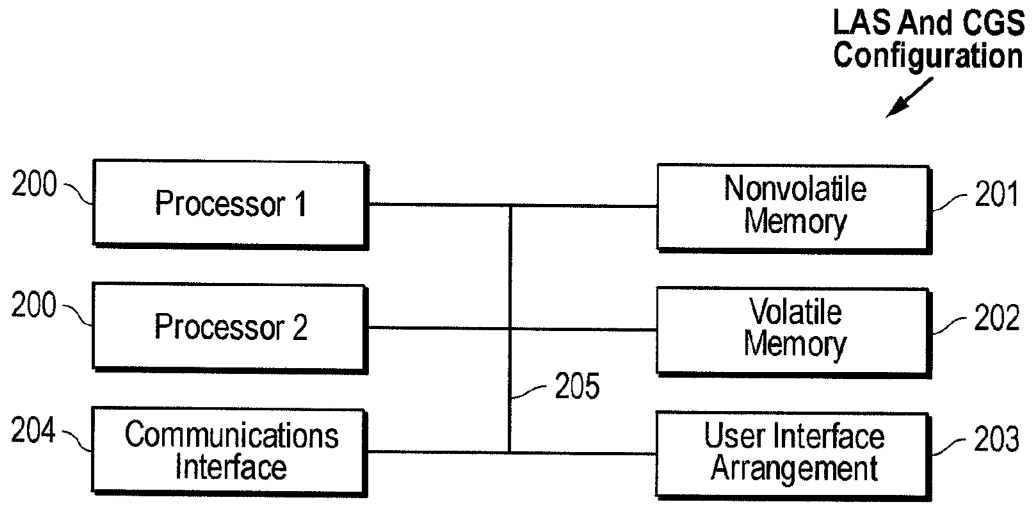
FIG. 2 is a diagrammatic representation of a computer system arrangement that may be used for the central game server and local area servers included in the system shown in FIG. 1.

CGS 101 may comprise a computer system such as the basic system shown in FIG. 2. The basic system may include one or more processors 200, nonvolatile memory 201, volatile memory 202, a user interface arrangement 203, and a communications interface 204, all connected to a system bus 205. It will be appreciated that user interface arrangement 203 may include a number of different devices such as a keyboard, a display, and a pointing device such as a mouse or trackball for example, although not shown in FIG. 2. Alternatively to the integrated user interface arrangement 203 shown in FIG. 2, a user interface for CGS 101 may be provided through a separate computer (not shown) in communication with the CGS. Regardless of the particular configuration for CGS 101, in the normal operation of system 100 shown in FIG. 1, the CGS functions to group players for participation in bingo games offered through the system, produces or obtains sequences of designations (ball draws, for example) for the play of the bingo games, identifies the bingo game results, and communicates the results to LASs 102.

As used in this disclosure, any sequence of designations that may be matched against bingo cards or bingo card representations in the present gaming system will be referred to as a "ball draw" regardless of how the sequence is actually generated. Under this definition, it will be appreciated that a ball draw may be produced by a random number generator, a pseudo random number generator, or any other suitable device or system, and not necessarily a physical ball draw device.

Each LAS 102 included in system 100 as shown in FIG. 1 may comprise a computer system having the same basic structure as shown in FIG. 2. That is, each LAS 102 may include one or more processors 200, nonvolatile memory 201, volatile memory 202, user interface arrangement 203, and communications interface 204, all connected to system bus 205. As with CGS 101, the user interface for the respective LAS 102 may be provided through a separate computer in communication with the LAS rather than the integrated user interface arrangement 203 shown in FIG. 2. Regardless of the specific configuration of the LAS, each LAS serves, in normal operation of the system shown 100 in FIG. 1, to transfer or relay information from its respective EPSs 103 to CGS 101 and transfer or relay information from the CGS to the LAS's respective EPSs. Each LAS according to the present invention may also have the ability to group players and actually play bingo games in certain situations. For example, where one LAS 102 serves a large number of EPSs 103, the LAS may group players or game play requests from its respective EPSs during a time of high player activity, obtain or produce a ball draw, identify bingo game results, and return results to the EPSs rather than having the CGS 101 perform these tasks. Also, each LAS 102 shown in FIG. 1 may be configured to perform the tasks normally performed by CGS 101 in the event the communications link between the respective LAS and CGS is degraded below a certain level or is severed altogether.

Figure 3:
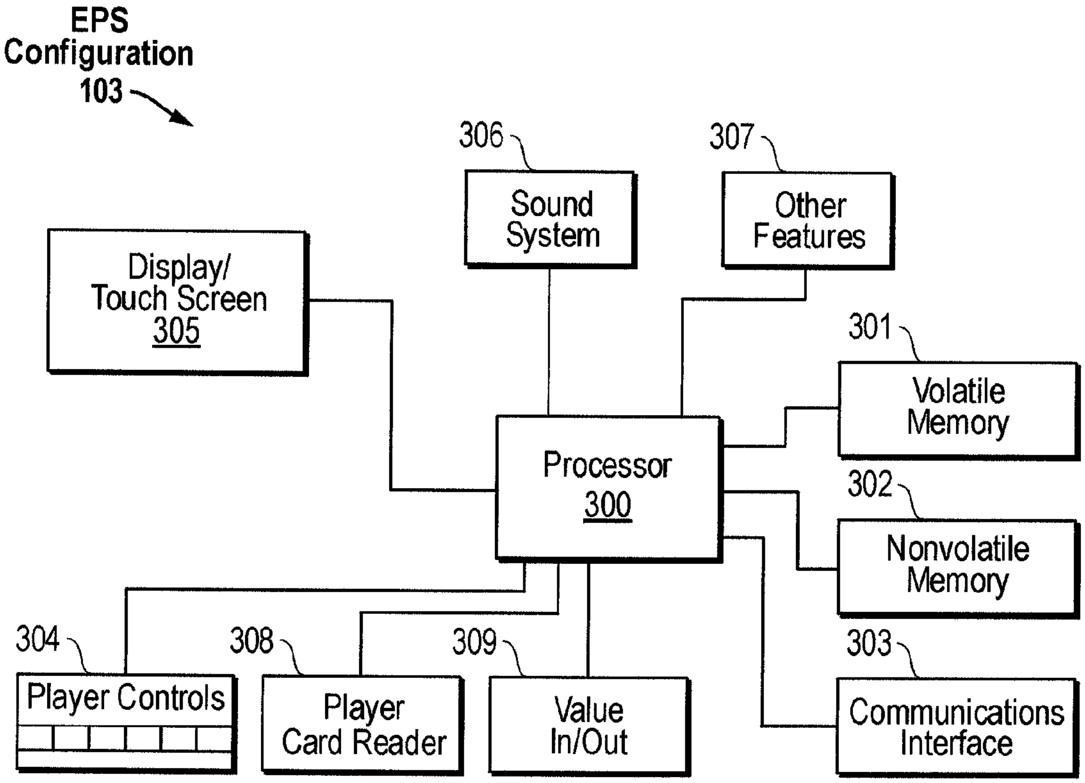
FIG. 3 is a diagrammatic representation of an electronic player station that may be used in the system shown in FIG. 1.

FIG. 3 shows an example of an EPS 103 that may be used in a gaming system embodying the principles of the present invention. The illustrated EPS 103 includes a processor 300, volatile memory 301, nonvolatile memory 302, and a communications interface 303. The volatile and nonvolatile memory stores computer program code that may be executed by processor 300 to cause the processor to perform or direct the various functions provided by EPS 103. Communications interface 303 allows communications between EPS 103 and its respective LAS 102 and/or CGS 101. EPS 103 also includes a special user interface arrangement to facilitate player participation in the bingo games offered through gaming system 100 shown in FIG. 1, and display results in an exciting and attractive format. This interface includes player controls 304, a display device or touch screen display 305, a sound system 306, and perhaps other features 307 such as alarms or special displays or alerting devices. Each EPS 103 also preferably includes a convenient system for allowing the player to input player-specific information and for receiving wagers and dispensing winnings. For example, the EPS 103 shown in FIG. 3 includes a player card reader 308 that is adapted to read player-specific information from a player account card inserted into the reader. A player account card may, for example, include player information or simply a player identifier encoded on a magnetic medium (mag stripe) associated with the card, or encoded on a bar code, or a memory device associated with the player account card. The illustrated EPS 103 also includes a device 309 for receiving value and issuing value in the course of play. This device may accept currency, vouchers, or tokens, for example, and also output currency, vouchers, or tokens. Of course, a separate device may be used to receive and issue value for games played according to the present invention. Alternatively, or in addition to value in/out device 309, EPSs 103 may read player account information from the player account card or from player information otherwise input at the EPS, and may account for wagers and winnings in the manner set out in U.S. Patent Application Publication No. 2002/0132666 A1, entitled "Distributed Account Based Gaming System."

It will be appreciated that the particular configuration of devices shown in FIG. 1 is shown only for purposes of example. A bingo gaming system according to the present invention may omit some or all of the separate LASs 102 at the various gaming facilities so that the EPSs 103 communicate directly with CGS 101. Also, various regions or different gaming facilities may be divided up into separate systems each having a respective CGS such as CGS 101. In these situations the system could be configured such that a single EPS 103 may be serviced by any of the CGSs. Furthermore, a gaming system embodying the principles of the invention may include multiple CGSs rather that a single CGS 101 as shown in FIG. 1.

In the following description of FIG. 4 and the other process flowcharts in this disclosure, it will be appreciated that the references to the physical components are references to the diagrams in FIGS. 1, 2, and 3 that show those components. The components, such as EPSs 103, LASs 102, and CGS 101 discussed with reference to the flowcharts are generally not shown in the flowcharts themselves but are shown particularly in FIG. 1.

Figure 4:
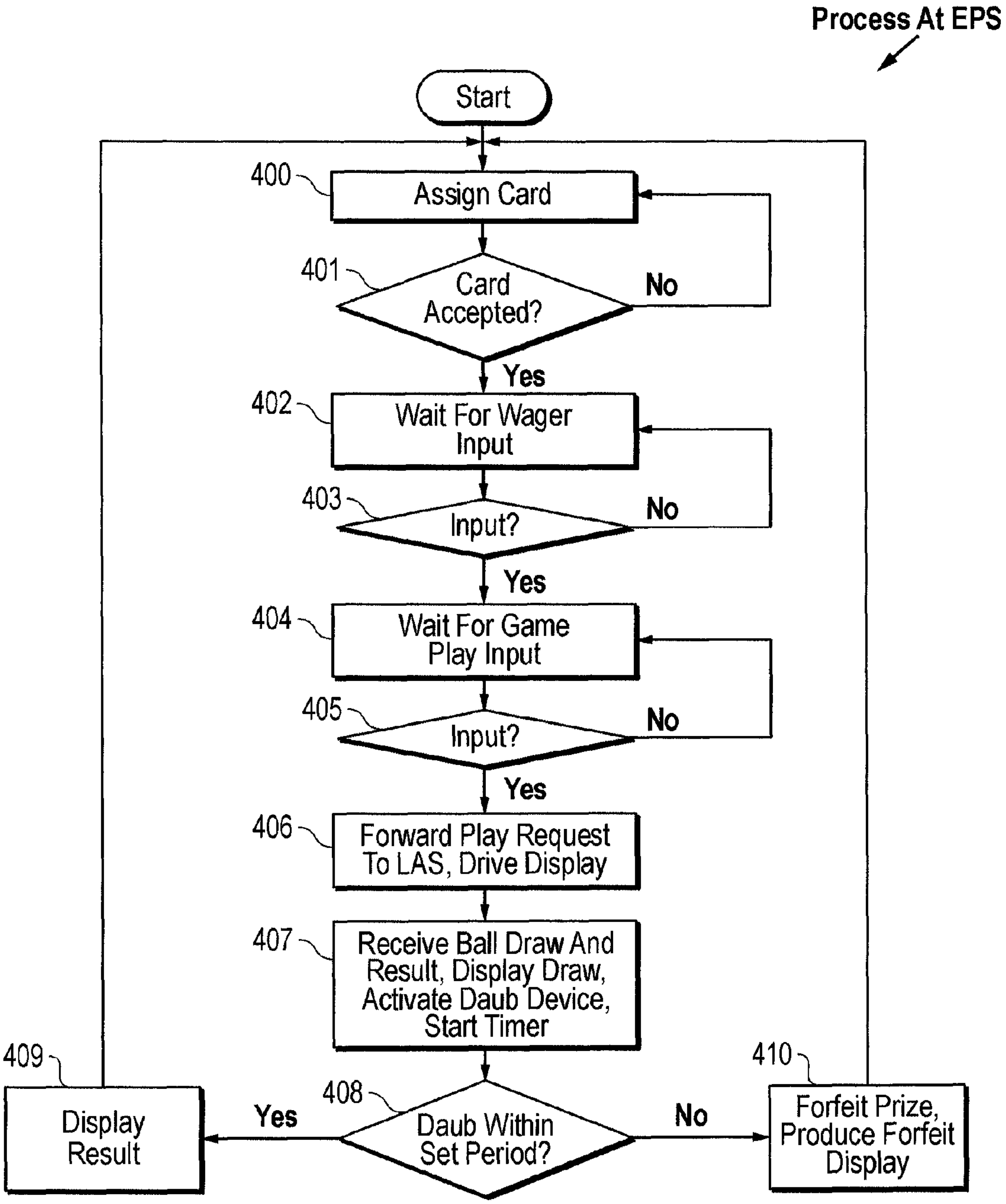
FIG. 4 is a flowchart providing a high level description of a process executed at the electronic player stations according to the present invention.

FIG. 4 shows a process that may be performed at an EPS 103 according to the invention. After EPS 103 is initialized and activated for use by a player, the process at the EPS includes assigning the player a bingo card as shown at process block 400. The player may have the option to accept or reject a presented card as indicated at decision block 401. Alternate forms of the invention may not give the player a choice in accepting or rejecting a bingo card. On the other end of the spectrum, an EPS 103 according to the present invention may allow the player to build their own card or select cards from a number of available bingo cards.

Each card that is assigned to the player according to the invention is associated with a game play request, and comprises a representation of a bingo card that includes some arrangement of symbols or designations. The bingo system 100 shown in FIG. 1 may be played with the standard 5-by-5 grid bingo cards, 3-by-3 grid bingo cards, cards comprising a single straight line of spots or card locations, or cards having some other arrangement of spots. Regardless of the nature of the bingo card played in the particular game, the card is represented by a data structure.

It will be appreciated that the card assignment step shown at process block 400 in FIG. 4 may require communications between the respective EPS 103 and its respective LAS 102 or the CGS 101. In particular, in order for the results of a bingo game for a particular card to be identified at one of the LASs 102 or the CGS 101, the respective LAS or the CGS must have a definition of the card that indicates the symbol or designation associated with each spot on the card. Making the card definition for a particular bingo card available to the component in the system that identifies the results of play for the particular bingo card may be handled in a variety of different ways within the scope of the present invention. In one preferred form of the invention, each EPS 103, each LAS 102, and the CGS 101 stores or has ready access to a bingo card definition file containing a large number of records each representing a particular bingo card and including a unique card identifier or index value. In this arrangement for storing card definitions, only the card identifier need be communicated between the system components in order for the system components to have a definition for the respective card. A system component having the card identifier for a particular card may simply look up the identifier in the card definition file and read the card definition associated with the identifier. For example, where a player selects a particular bingo card at an EPS 103, the EPS may communicate the card identifier to the respective LAS 102 or CGS 101, and the LAS or CGS may then use the card identifier to obtain the actual definition for the card, that is, the designations assigned to the various card spots.

Alternatively to including a card definition file at each of EPS 103, each LAS 102, and CGS 101, the various components may communicate the actual card definitions. Communicating the actual card definitions obviates a requirement for storing card definition files at the various system components but requires that more data be communicated between the various system components.

A card assignment process within the scope of the present invention may include additional actions or communications by the respective EPS 103 and the respective LAS 102 and/or CGS 101, depending upon the rules of play in system 100. For example, the card assignment process may give the player at EPS 103 the option of defining his or her own bingo card or cards to place in play. In this situation, EPS 103 or some other component in the system may compare the card defined by the player to a predefined set of cards to locate an identifier for that particular card. Only the card identifier then needs to be communicated to the various components in the system to communicate the definition of the player's card assuming those components have access to a card definition table identifying each card representation by the assigned identifiers. Also, in situations in which players may define their own bingo card or cards, a system according to the present invention may include a process to ensure that two players do not have the same card in play in a particular game. This process may prompt the player to define a different card or may automatically return an even money result as discussed further below without actually entering the player in a bingo game.

In addition to the card assignment process indicated at blocks 400 and 401, the EPS process shown in FIG. 4 allows the player to enter a wager or card price for playing the card in a game offered through EPS 103. Process block 402 and decision block 403 indicate that EPS 103 waits for a wager input before proceeding on to the process. In preferred forms of the invention, the player may choose from a number of different wager levels or card price levels for each card the player places in play and these card price levels may be defined in terms of currency, credits, or in some other fashion.

Once the card is assigned to the player at EPS 103, and the price of the card or wager is defined, the card may be entered in a bingo game administered by system 100 in which the respective EPS 103 is included. As indicated at process blocks 404 and 405 in FIG. 4, the EPS 103 may wait for a separate game play input or game play request entered by the player at the EPS, and only then proceed to forward the game play request to the other components of system 100. In other preferred forms of the invention, a separate input may not be required in order for the player to enter into a bingo game. For example, simply defining the wager may automatically enter the bingo card in a bingo game without any separate game play request, or, where the wager is predefined, the step of accepting a particular bingo card may enter the player in a bingo game. As yet another alternative, simply making a game play request at an EPS 103 may define a bingo card for the player, define a wager level, and send a request to enter that bingo card in a bingo game administered through system 100.

Once the player has, in one fashion or another, made an input at EPS 103 to enter their card or cards in a bingo game administered through the gaming system (100 in FIG. 1), the EPS forwards a game play request to the respective LAS 102 as indicated at process block 406 in FIG. 4, and preferably drives a display showing some type of entertaining graphics pending the return of the result(s) for the player's card(s) in the bingo game. For example, EPS 103 may be configured to display results associated with the underlying bingo game in terms of reel stop positions for a reel-type gaming machine (slot machine). For this type of result display, the step of driving the display at process block 406 may include showing a number of reels spinning to imitate the spinning reels one would see immediately after activating a traditional reel-type gaming machine. Alternatively, results from the bingo game may be displayed in some other entertaining fashion such as a horse or dog race for example, and the step of driving the display shown at process block 406 in FIG. 4 may include an initial portion of the race. In yet other forms of the invention, results may be displayed as in a traditional bingo game and the step of driving the display shown at process block 406 in FIG. 4 may include simply displaying the bingo card that has been assigned to the player and placed in play. Even where the results of the bingo game may be shown with entertaining graphics unrelated to the bingo game, a portion of the display at EPS 103 is preferably devoted to a representation of the bingo card in play and ball draw for the bingo game in which the card is entered.

The nature of the communication forwarding the game play request to LAS 102 will depend upon a number of factors. For example, the communication may include an actual card definition for each card that defines the respective player's card which is in play for the game. Alternatively, where card definition files are available at the various system components as described above, the communication may include a card identifier for each card placed in play and this identifier may be used to locate the actual card definition. In still other forms of the invention, the player's card or cards placed in play from EPS 103 may have been known to the LAS 102 or CGS 101 from the card assignment process shown at process blocks 400 and 401. In this case, the game play request sent to LAS 102 at block 406 in FIG. 4 may not include even an identifier for the card(s) in play, but merely some signal for the LAS to place the card(s) in play for the requesting player.

Regardless of how EPS 103 drives the display at process block 406 in FIG. 4, the EPS receives a ball draw for the game in which the player has been entered and, for each card placed in play, a result for the game play which has been identified at the LAS 102 or CGS 101 as will be described in detail below. The receipt of the ball draw and result is shown at process block 407 in FIG. 4. The result received at EPS 103 represents the result of the respective player's card in the bingo game in which the player's card has been entered. As in any bingo game the result is associated with some pattern and/or sequence of spots on the player's bingo card that have been matched by designations in the ball draw. However, it will be appreciated that the result communicated to EPS 103 at process block 407 is preferably some result code that represents the actual bingo result. The ball draw and result may be sent to EPS 103 separately or in a single communication. In either case, the preferred form of the invention displays the ball draw on the display associated with the EPS prior to the time the respective game result is displayed.

In some preferred forms of the bingo gaming system, the bingo player must claim their bingo prize associated with a winning result. In systems in which the player must claim their prize, the EPS process may include activating a prize claiming or daub input at EPS 103 in the event a game play returns a winning result. This prize claiming or daub input activation is included at process block 407 in FIG. 4 along with the activation of a timer which sets a time period for the player to actuate the prize claiming or daub input and claim the prize. In a preferred form of the process at EPS 103, the EPS also produces a display indicating to the player that they must take a particular action to claim their prize, and indicating or counting down the time remaining to claim the prize. This timer or countdown display may be in addition to or in lieu of the display initiated at process block 406. A countdown timer display according to the invention may be superimposed on the display initiated at process block 406.

If the player claims their prize by taking the appropriate action within the set period of time as indicated by decision block 408 in FIG. 4, EPS 103 displays the result of the game for the player as indicated at process block 409, and the gaming system awards the prize to the player. In the example described above in which the results may be displayed by reel-type or slot machine graphics, the display at EPS 103 may show reels stopped in particular positions that together correspond to the result achieved by the player in the bingo game. In the example where the results are shown by a horse or dog race, EPS 103 may show a particular horse or dog in a win, place, or show position corresponding to the result the player has achieved in the bingo game.

In the event the player at EPS 103 does not take the required action to claim the prize within the set period of time, the prize associated with the player's result in the bingo game may be forfeited as indicated at process block 410. In the case of a forfeited prize, EPS 103 may also produce a suitable display to indicate to the player that the prize associated with the play in the bingo game has been forfeited. Any forfeited prizes may be collected and applied to a progressive game offered through system 100 or may be collected for use as a charitable contribution. The forfeiture process may include subtracting a prize value from the player's account. This prize value may have been previously added to the player's account by system 100 automatically in response to the winning result.

Whether a prize has been forfeited as shown at process block 410 or has been claimed and the result displayed as shown at process block 409, the process at EPS 103 may return to card assignment steps 400 and 401 as shown in FIG. 4. It will be appreciated that the process may automatically assume that the player wishes to make the same wager placed in the previous play. Thus, the process may return to a point in the process different from that shown in FIG. 4. A number of different options may be provided to the player at EPS 103 to allow the player to choose a different card or cards to enter in another bingo game administered through system 100.

In some instances, the result from the bingo game may not be associated with any prize. In these instances, the process at EPS 103 may not activate a daub or prize claiming input device, and not wait for an input before displaying the result. Rather, the process at EPS 103 may simply include displaying the non-winning result immediately after receiving the result from LAS 102 without further intervention on the part of the player.

It will be noted from FIG. 4 that participation in a bingo game offered through an EPS 103 can be thought of as a three-step process aside from any login step that may be required at the EPS. The first step includes the card assignment process and the buy-in or wager amount selection process as indicated at process blocks 400 through 403 in FIG. 4. In the second step, the player places the card in play as indicated at process blocks 404 and 405 in FIG. 4. In the third step required to participate in a game, the player daubs the card once the bingo numbers have been drawn. This last participation step is indicated by the decision block 408 in FIG. 4. The course taken from decision block 408 turns upon whether the prize claiming or daub input has been entered by the player.

In some forms of the invention, the player's failure to enter a prize claiming or daub input may not result in the forfeiture of the prize, but rather cause the underlying bingo game to proceed with the ball draw (or additional numbers in the already defined ball draw sequence). In these forms of the invention, a player's failure to claim the game ending prize causes the underlying bingo game to continue with additional bingo numbers until another game ending winner is produced. This new game ending winner may then be given the opportunity to claim the game ending prize. If the player fails to enter the prize claiming or daub input at this point, the prize may be forfeited or the game may proceed again until another new game ending winner is determined.

In yet other forms of the invention, the EPS 103 may force the player to take a daubing action in order to proceed on to another game. Also, the daubing step may be defined broadly so as to ensure that a player takes the daubing step to claim their prize. For example, where a player card must be inserted into an EPS 103 in order for a player to participate in a bingo game offered through system 100, the act of removing the player card may be defined as an act of daubing a card if the EPS 103 is waiting for a daub input from the player.

Figure 5:
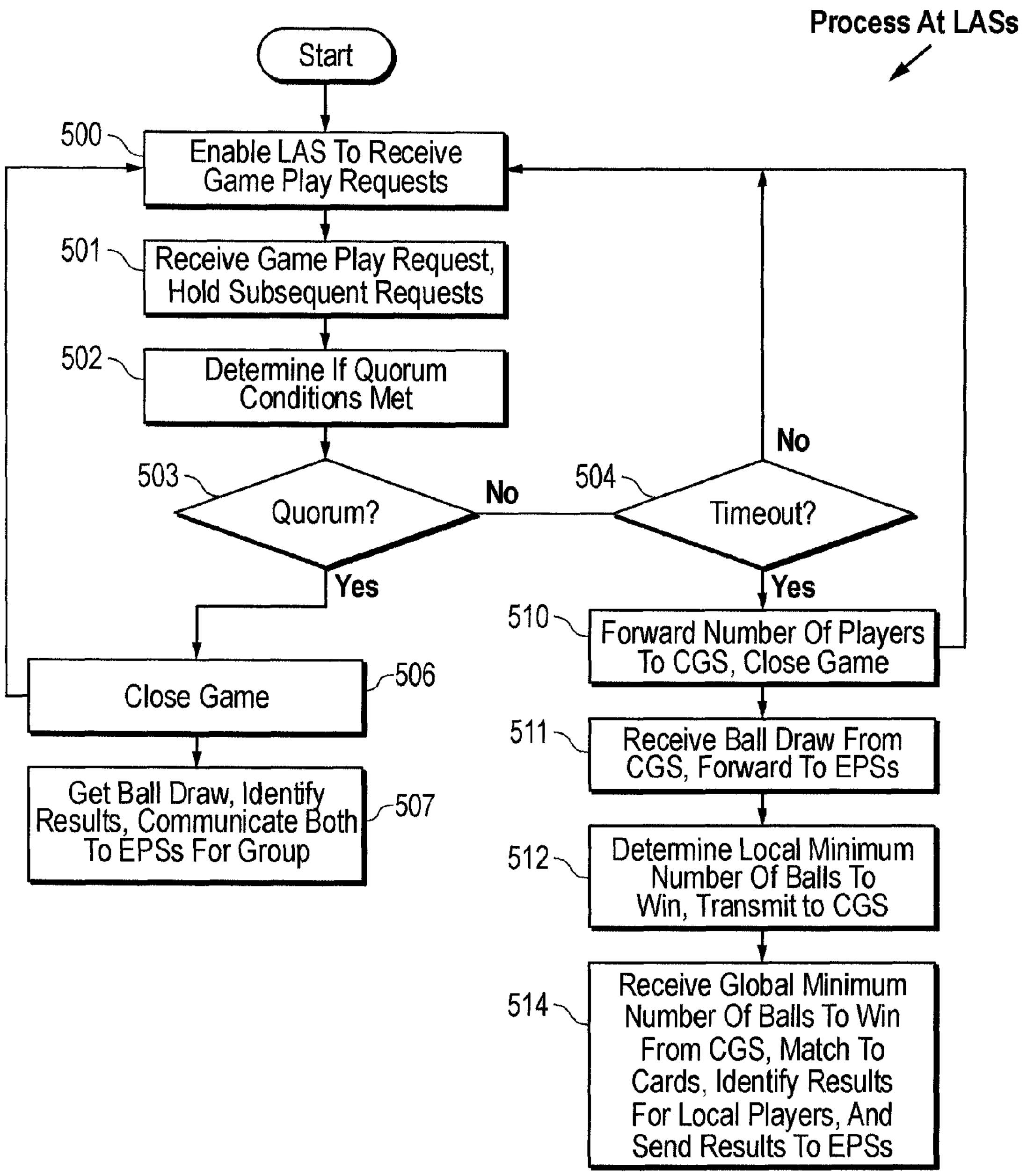
FIG. 5 is a flowchart providing a high level description of a process executed at the local area servers according to the present invention.
Figure 6:
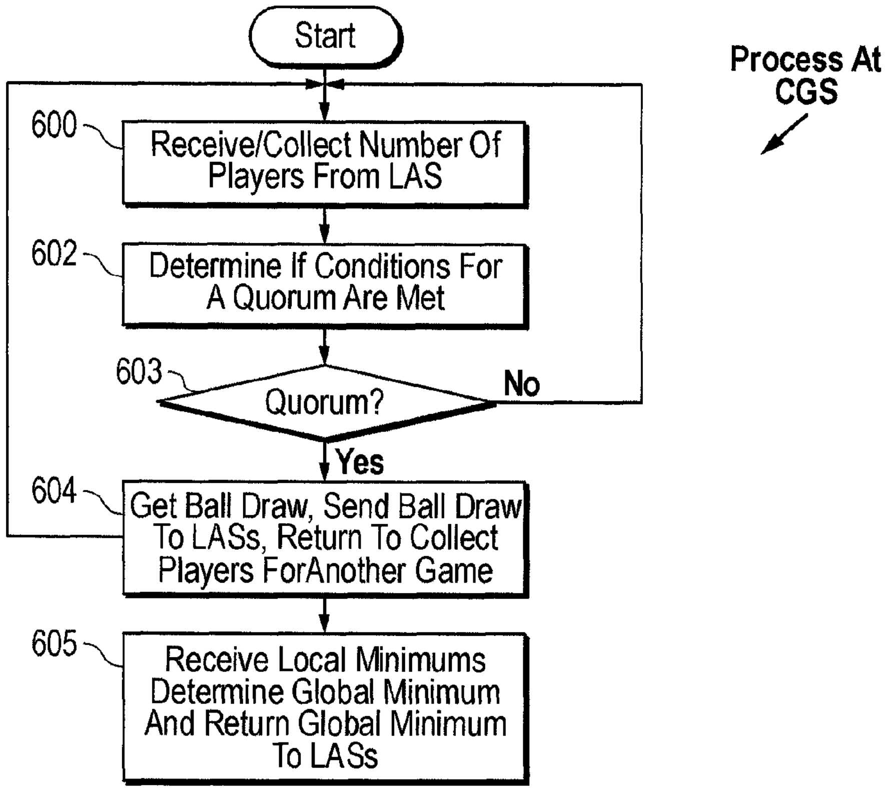
FIG. 6 is a flowchart providing a high level description of a process executed at the central game server according to the present invention.

FIGS. 5 and 6 may be used to describe one preferred arrangement for cooperation between the LASs 102 and the CGS 101 in system 100 shown in FIG. 1, and to describe the processes performed at the LASs 102 and CGS 101 in that arrangement. In this particular arrangement for cooperation between LASs 102 and CGS 101, a LAS may group players or game play requests for a game available through system 100 if the group may be produced in a timely fashion from game play requests received from EPSs 103 local to the respective LAS. The group of players or game play requests for a game administered through system 100 will be referred to in this disclosure as a quorum and will comprise some minimum number of players that may be a fixed number, a range of numbers, or a number determined dynamically depending upon certain system operating parameters and/or the nature of the game play requests. In the arrangement shown in FIGS. 5 and 6, it is only if the respective LAS 102 cannot produce a quorum among local game play requests that the game play requests from different gaming sites are grouped by CGS 101 for the play of bingo games.

Referring now to FIG. 5, the respective LAS 102 is placed in a state in which it is enabled to receive game play requests from its respective EPSs 103 as indicated at process block 500. Upon receipt of a game play request as indicated at process block 501 (from one of its respective EPSs 103), LAS 102 may temporarily hold any subsequently received requests while the system checks for a local quorum. LAS 102 then checks to see if the predefined conditions for a quorum are met as shown at process block 502 in FIG. 5. The various processes that may be used to determine if the predefined conditions for a quorum have been met will be described in detail below with reference to FIGS. 9 and 10. If the predefined conditions for a quorum are not met as indicated at decision block 503, the process branches to decision block 504 and LAS 102 determines if the time for obtaining a local quorum has expired. If the end of the predetermined time set for obtaining a quorum locally from EPSs 103 has not expired, the process returns back to block 500 and LAS 102 is enabled to receive the next game play request.

If the predefined conditions for a quorum are met at decision block 503, the process branches to block 506 and LAS 102 closes the game with the currently collected game play requests and returns to process block 500 to begin collecting game play requests for a different bingo game. By closing the game, it is meant that the game play requests for a given bingo game to be played in the system have been selected and no further game play requests are entered in that bingo game. As shown at process block 507, LAS 102 then proceeds to conduct a bingo game for the collected group of game play requests. That is, LAS 102 produces or obtains a ball draw and identifies the results of the game by checking the ball draw against the bingo cards which have been entered in the game, each card being associated with a separate one of the game play requests. LAS 102 also communicates the ball draw to each EPS 103 from which a game play request in the group originated and communicates the result for each game play request in the group to the respective EPS from which the respective game play request originated.

If the predetermined conditions for a quorum have not been met locally as indicated at decision block 503 and the time has elapsed for obtaining a quorum locally as indicated by decision block 504, the process at LAS 102 branches to process block 510 at which point the LAS forwards the number of collected game play requests to CGS 101. LAS 102 also closes the game and returns to process block 500 to again begin the process of collecting game play requests in an effort to produce a quorum. The process at LAS 102 continues by receiving a ball draw from CGS 101 and forwarding the ball draw to the EPSs 103 from which the group of game play requests originated as shown at process block 511. With the ball draw for the game at hand, LAS 102 proceeds to check the ball draw against each card in play in the game to determine a minimum number of balls to win the game among the local players playing through that LAS, and transmits that local minimum number of balls in the ball draw to CGS 101. These steps are shown at process block 512. As shown at block 514, LAS 102 then receives from CGS 101 a global minimum number of balls from the ball draw, matches the global minimum number of balls to the cards in play through that LAS to identify the result associated with each respective card, and distributes each result to the appropriate EPSs 103.

Referring now to FIG. 6, the process at CGS 101 that corresponds to the LAS process shown in FIG. 5 includes collecting or receiving the number of players for a game from the various LASs 102 in system 100 (FIG. 1). This receiving step is shown at process block 600 in FIG. 6. The number of players received at this step is the number communicated from each LAS 102 at process block 510 in FIG. 5. CGS 101 also determines if the conditions for a quorum have been met as shown at process block 602. Specific arrangements for determining whether quorum conditions have been met will be discussed below with reference to FIGS. 9 and 10. Regardless of how the quorum is determined, if the conditions for a quorum are met as indicated at decision block 603, CGS 101 produces or obtains a ball draw and, as shown at process block 604, sends the ball draw to the particular LASs 102 from which communications were received at process block 600. As shown at process block 605, CGS 101 then receives all local minimums from the various LASs 102. The local minimum information is the information transmitted according to process block 512 in FIG. 5. CGS 101 also then determines the global minimum number of balls from the draw to produce a win and transmits this global minimum number of balls to the various LASs 102 from which communications were received at process block 600. The various LASs 102 servicing game play requests for this particular bingo game may then identify and distribute results as indicated at process block 514 in FIG. 5.

It should be noted from FIG. 6 that if predefined conditions for a quorum are not met at decision block 603, the process returns to process block 600 to receive further communications from the various LASs 102 in an effort to make a quorum for the play of a bingo game. Although not shown in FIG. 6, embodiments of the invention may include a timer feature that times out if a quorum is not produced within a certain period of time. Such a time out would cause CGS 101 to communicate back the LASs 102 that a game may not be completed. The LASs 102 may communicate to the requesting players at the various EPSs 103 to try again or the LASs may return an even money result to the requesting players as will be described further below. It should also be noted that even if conditions for a quorum are met for one group of collected game play requests at process block 604, CGS 101 still returns to process block 600 to begin collecting game play requests to make another quorum for another bingo game.

In the processes illustrated in FIGS. 5 and 6, CGS 101 receives from the LASs 102 only a number representing the number of players or game play requests available for grouping together to play a bingo game according to the invention. CGS 101 does not receive further information regarding the players such as the cards that the various players have placed in play through their respective game play requests. Thus, CGS 101 is unable to determine on which ball in the ball draw a game winner occurs and the CGS must cooperate with LASs 102 to determine a global minimum representing the number of balls to produce a winner among the various players grouped for the given bingo game. In alternate forms to the invention, CGS 101 receives from LASs 102 or EPSs 103 either the bingo card definitions themselves or the information necessary to determine the definitions of the cards in play for the bingo game. In this alternate arrangement, CGS 101 may identify the results of the bingo game and may communicate the results back to the LASs 102. This alternate arrangement obviates the need for the LASs 102 to identify results as indicated at process block 514 in FIG. 5 and eliminates some of the communications between the LASs 102 and CGS 101 as will be described further below in the alternate processes illustrated in FIGS. 7 and 8.

Figure 7:
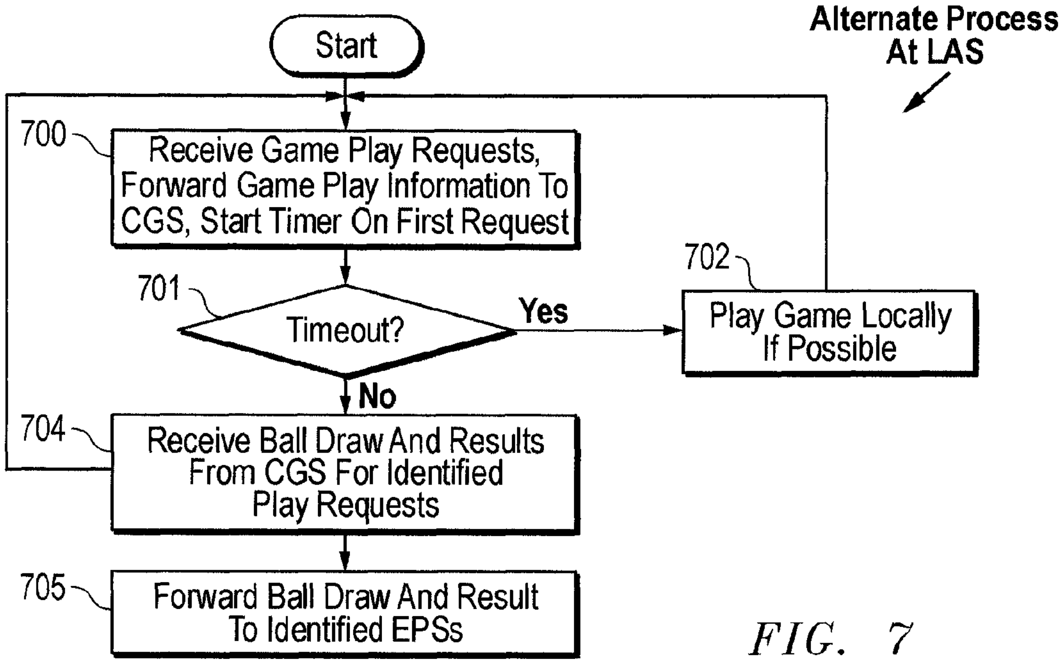
FIG. 7 is a flowchart showing an alternate process executed at the local area servers.

Referring now to FIG. 7, an alternate process at each LAS 102 within the scope of the present invention includes at process block 700 receiving a game play request from one of the EPSs 103 serviced by respective LAS and immediately forwarding the game play request to CGS 101 along with information associated with the request such as a card definition or card identifier from which the card definition may be determined. As shown at process block 700, the LAS process may also include starting a timer on the receipt of the first game play request from a local EPS 103 for a given game. If a timer set at process block 700 times out before CGS 101 returns a ball draw and results for the game play requests which have been collected and forwarded to the CGS as indicated at decision block 701, LAS 102 may attempt to play the game locally if possible as indicated at process block 702. A timeout may occur if the communications link has been broken with CGS 101, or if the communications link has been degraded in some fashion. In this case it is necessary for LAS 102 to attempt to play games with only local players. Of course, if quorums cannot be produced locally with sufficient speed, LAS 102 may simply notify the EPSs 103 that new games are not presently available, or if the situation is transient, return even money results to the requesting players as discussed further below.

In situations where no timer is used at LAS 102 or a timeout has not occurred at decision block 701, the LAS receives a ball draw for the game play requests it has forwarded to CGS 101 along with the results of the game for those game play requests/players. The actual communications between LAS 102 and CGS 101 may require that the ball draw is sent in one communication and the results are sent as a separate communication or communications, otherwise both the ball draw information and results for the game may be sent as a single communication. At process block 704, LAS 102 receives the ball draw and results for the collected number of game play requests that were forwarded to CGS 101. The process at LAS 102 then proceeds to forward the received ball draw to the EPSs 103 from which the collected game play requests originated, as shown at process block 705. LAS 102 also forwards the results for the various game play requests, that is, the game results, to the respective EPSs 103. It will be noted that once a ball draw and results have been received for one group of game play requests that have been forwarded to CGS 101, the process returns back to process block 700 and continues to receive and forward game play requests for another bingo game as indicated by the line returning from block 704 to a point in the process immediately below the starting point.

Figure 8:
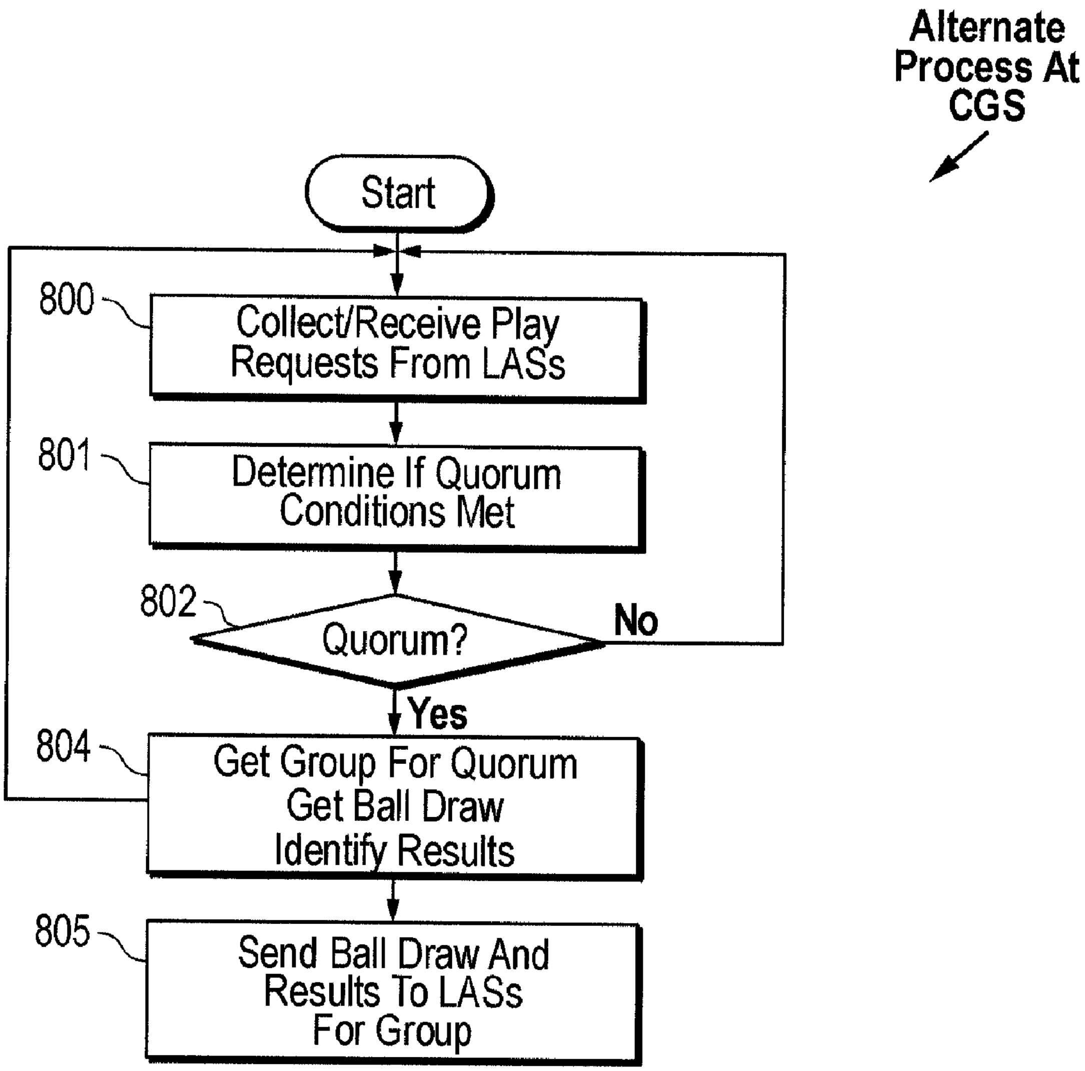
FIG. 8 is a flowchart showing an alternate process executed at the central game server in connection with the process shown in FIG. 7 for the local area servers.

FIG. 8 shows a process at CGS 101 that may be used in connection with the LAS process shown in FIG. 7. The process for CGS 101 includes collecting or receiving play requests from the various LASs 102 as shown at process block 800 in FIG. 8. CGS 101 also determines if predetermined quorum conditions have been met as shown at process block 801. Preferred alternatives for this quorum determining step will be described below with reference to FIGS. 9 and 10. If it is determined that conditions for a quorum have not been met at decision block 802, the process returns back to process block 800 to collect or receive further play requests from LASs 102. However, if conditions for a quorum have been met as indicated at decision block 802, CGS 101 collects or segregates the group of game play requests making up the quorum for a bingo game, obtains or produces a ball draw for the game, and identifies the results associated with the game by comparing the ball draw with the bingo cards associated with the game play requests which make up the quorum. These functions are shown at process block 804 in FIG. 8. In addition to the other steps set out at process block 804, the process returns back to process block 800 to begin collecting game play requests from the LASs for another bingo game. As shown at process block 805 in FIG. 8, CGS 101 also communicates the ball draw and results for a given game to the LASs 102 implicated for the particular quorum that was determined at process block 801.

Figure 9:
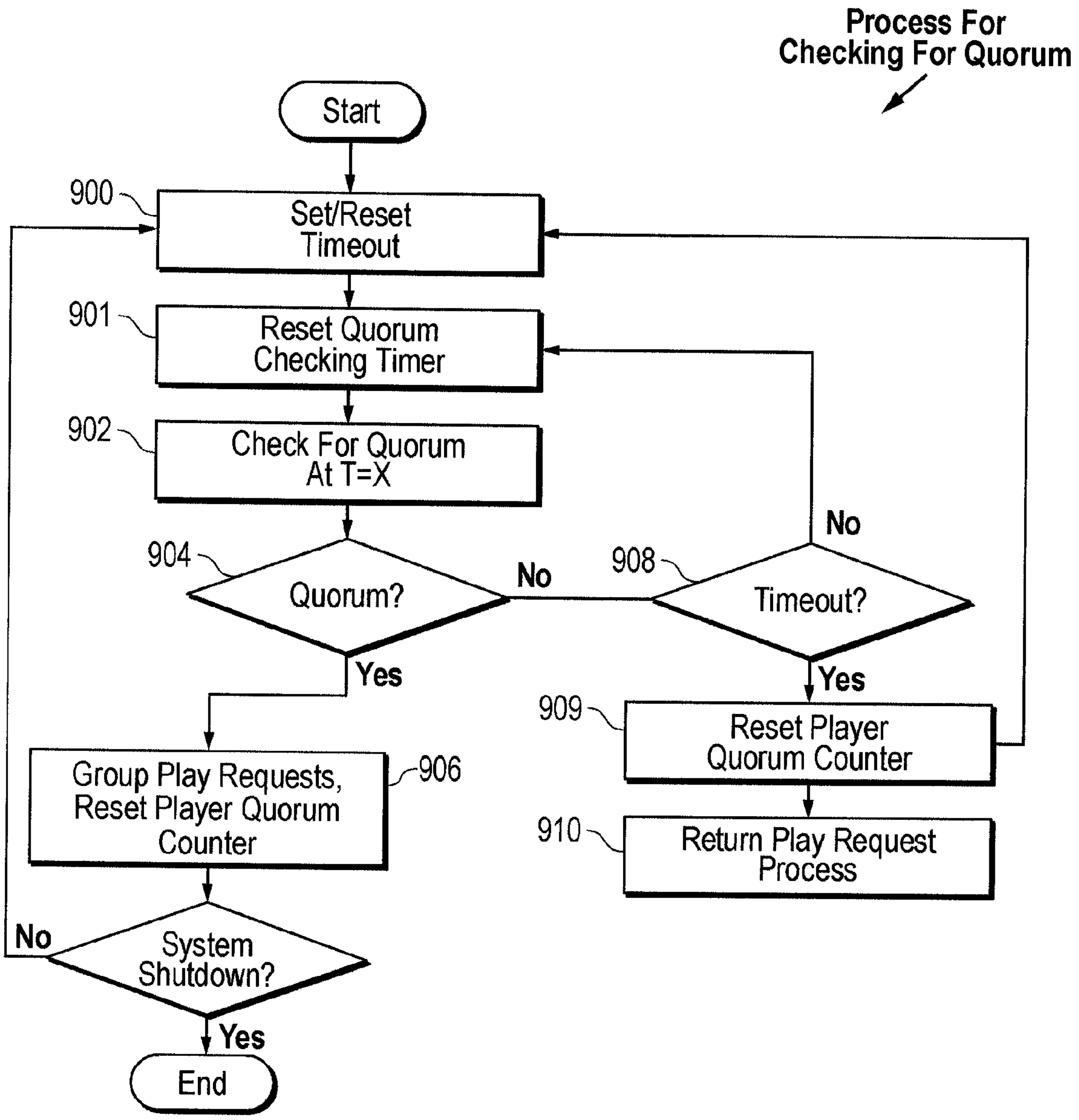
FIG. 9 is a flowchart showing a process for defining a set of players for a game in a bingo gaming system according to the present invention.

FIG. 9 shows one process according to the present invention for determining if a quorum exists for a bingo game to be played through system 100 (FIG. 1). This process starts with the step of setting or resetting a timeout timer as shown at process block 900. The timeout timer is used to keep track of the overall time that has elapsed since starting to collect a quorum in system 100. The process next includes resetting a quorum checking timer as shown at process block 901. The quorum checking timer sets an incremental, predetermined period for checking for a quorum. This predetermined period may be very short for systems including many EPSs 103. For example, the quorum checking time increment may be on the order of 25 milliseconds. As shown at process block 902 in FIG. 9, the process next includes checking for a quorum at the end of the incremental, predetermined period of time set at process block 901. If, at decision block 904, the number of game play requests that have been collected at the end of the predetermined period meets the minimum number to produce a quorum for playing a bingo game according to the invention, the process branches to block 906. At this point the component checking for a quorum, either a LAS 102 or the CGS 101, groups the collected game play requests representing the quorum. The process at block 906 may also include checking if a queue location has been allocated, and deallocating queue entries where the game play requests have been collected in a queue, and/or resetting a counter where a counter has been used to count game play requests. The process then returns to block 900 and resetting the timeout timer unless the system is being shut down.

If the number of game play requests which have been collected does not meet requirements for a quorum as indicated at decision block 904, the process proceeds to check the timeout timer to determine if the overall time limit for obtaining a quorum has elapsed. If the timeout timer has not expired as indicated at decision block 908, the process returns to block 901 and the quorum checking timer is reset. If a timeout has occurred as indicated at decision block 908, the process shown in FIG. 9 includes resetting the game play request queue if used and/or resetting a game play request counter as shown at process block 909. From block 909 the process returns back to process block 900 to reset the timeout timer and again attempt to collect a quorum to play a bingo game in the system. The process may also include performing a game play request return process as indicated at process block 910 in FIG. 9. This process is used to return game play requests that cannot be filled in a reasonable time according to the rules set for producing a quorum in the system. The process indicated at process block 910 may include sending instructions to the EPSs 103 causing them to produce a display indicating that the game play request and the associated wager is being returned and to try again. Alternatively, the game play request return process may include returning an even money result to the implicated players as will be discussed further below.

Figure 10:
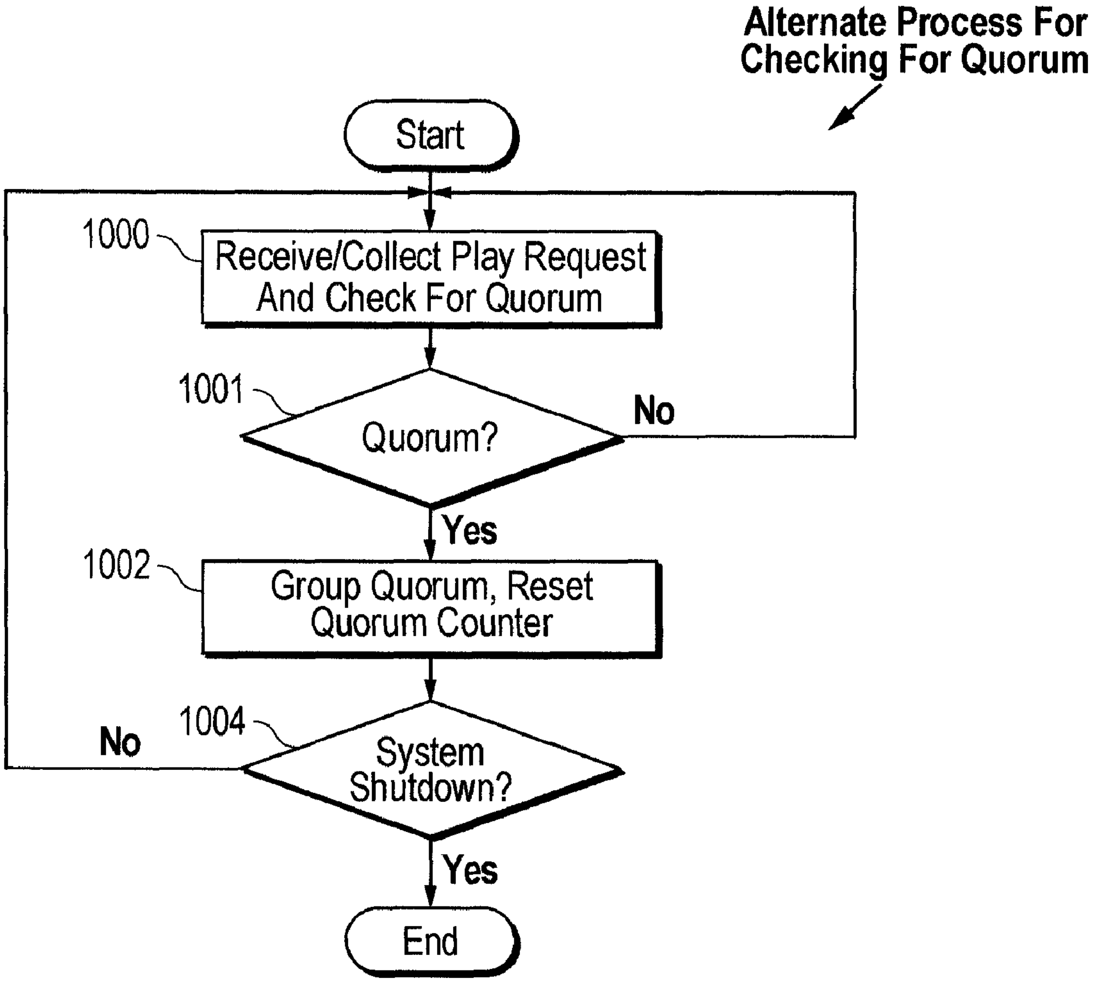
FIG. 10 is a flowchart showing an alternate process for defining a set of players for a game in a bingo gaming system according to the present invention.

FIG. 10 shows an alternate process for checking for a quorum of game play requests according to the present invention. In this alternate process, checking for a quorum is not conducted according to any time schedule. Rather, the alternate quorum checking process includes receiving or collecting a game play request and then immediately checking for a quorum as indicated at process block 1000. In one preferred arrangement for implementing the process shown in FIG. 10, each received game play request (or data representing the game play request) is stored in a first in/first out queue. Checking for a quorum in this implementation includes checking to see if all or a desired number of queue locations have been allocated, that is, store valid data for a received game play request. Instead of checking to see if the desired number of queue locations have been allocated, the quorum checking process may maintain a counter that provides a value indicating the number of received game play requests that are available for grouping for a bingo game according to the present invention. In this implementation, checking for a quorum includes evaluating the number of game play requests received as indicated by the counter to see if that number is greater than or equal to some desired minimum number for a bingo game. It will be noted that the same options for checking for a quorum at process block 1000 may be employed at process block 902 in FIG. 9, even though the checking is done at certain time intervals in that process as opposed to being done upon receipt of each game play request.

Regardless of how the system checks for a quorum of collected game play requests, if a quorum is not available as indicated at decision block 1001, the process returns to wait for the next game play request received. However, if it is determined that a quorum is available at decision block 1001, the process proceeds on to process block 1002 at which the quorum is formed, that is, a group of game play requests are identified for a particular bingo game according to the invention. The process at block 1002 may include reading the data from the queue locations for the game play requests in the group or quorum and deallocating those queue locations to make them available for additional game play request data. Where a counter is used to track the number of received game play requests, the process at block 1002 may include clearing or resetting the counter to start counting game play requests for the next quorum/bingo game. After process block 1002, the process returns to wait for additional game play requests or ends if the system is being shut down as indicated at decision block 1004.

Either of the processes or any other suitable process for determining if quorum conditions have been met may be employed by the LASs 102 at process blocks 502 and 503 in FIG. 5 or process block 702 in FIG. 7, or by CGS 101 at process block 602 in FIG. 6 or process block 801 in FIG. 8. Also, it should be noted that the invention is not limited to these illustrated processes for determining if conditions have been met for a quorum. In particular, the conditions of a quorum may be modified dynamically according to conditions in the gaming system and/or according to the nature of the game play requests that have been received. For example, during times of heavy activity in gaming system 100 shown in FIG. 1, the conditions for establishing a quorum may be dynamically increased to some optimum level. On the other hand, in times of low system utilization or where the LASs 102 attempt to create local quorums, the conditions for a quorum, for example the number of players/game play requests required for a quorum, may be decreased to some minimum level. The decrease in the number of game play requests needed to make a quorum may take into account the payouts available in the bingo game and the permissible delay between the time a player makes a game play request and the time that results are available to be displayed to the player in response to a game play request. In any event, decreasing the number of game play requests needed for a quorum to play a bingo game through system 100 in FIG. 1 may have the effect of reducing the time required to produce a quorum and thus reduce the maximum delay between the time the player makes a game play request, that is, places his or her card in play, and the time they receive the result of the bingo game at the EPS 103.

It should further be noted that the number of game play requests grouped together for a bingo game according to the invention need not be a static number at any given time. Although the system may be configured to simply group a fixed number of game play requests when a quorum is achieved under the applicable quorum rules, some forms of the invention may be configured to group more or fewer game play requests depending upon other factors. For example, in either the quorum checking process shown in FIG. 9 or 10, the process of checking for a quorum will take some time even in a high speed processing system. During this time, the component which is performing the quorum check may receive one or more additional game play requests. To handle these additional game play requests, the system may employ a buffer to hold game play requests received during the quorum checking process. If the check detects a quorum for the play of a bingo game, the grouping process may take not only the collected game play requests but also any game play requests that have been stored in the buffer during the quorum checking procedure. Also, where the check for a quorum of collected game play requests indicates there is only a small number of requests below a desired minimum, and the number of received game play requests has remained static for a certain period of time, the system may be configured to declare a quorum with only the received number of game play requests even though it may be below the desired number for a quorum.

In operation of the present bingo gaming system, there may be situations in which a quorum suitable for playing a bingo game is not obtained in a reasonable time. The process shown in FIG. 9 for example shows a return game play request process at block 910. Any process for checking for a quorum used in the present system may include such a return game play request process. Rather than causing the EPSs 103 to ultimately provide some indication to the player that the game play request could not be honored, the LAS 102 or CGS 101 as the case may be, may instead send the EPSs 103 from which the game play requests originated a command or signal which causes the EPSs 103 to produce a display showing an even money result. That is, the EPSs 103 may display a result in which the payout is equal to the bet or wager. In this way, the player may not even know that his or her game play request could not be honored and thus they do not feel the frustration that could arise in that situation. Other implementations may return an even money result and cause the EPS 103 to display a message indicating that no game was played to obtain that result. A system embodying the principles of the present invention may display an even money result to a player any time the game play request cannot be honored for whatever reason or just in certain circumstances such as when a quorum cannot be produced in a certain maximum time or when there is some problem with the play request from the EPS (e.g. when the same bingo card is already in play in a given game as described above). The decision to force an even money result at an EPS 103 in lieu of an actual result in a bingo game is preferably made by a system component that identifies the result in the bingo game so as to avoid any conflict with an actual result in a game. However, the present invention may force an even money result display in lieu of an actual result at a component that may not identify the bingo game results. For example, an EPS 103 may be programmed to display an even money result after a certain period of time has elapsed at the EPS after the game play request was first communicated.

Many of the process steps described in FIGS. 4-10 are preferably performed by processing devices, such as those described in FIGS. 1-3, under the control of operational program code. For example, first collection program code can be used to collect a first group of game play requests at either an LAS 102 or the CGS 101 as described in relation to process blocks 501, 700, 800 and 1000. As discussed previously, the game play requests are collected from a number of EPSs 103. Quorum checking program code can be used to implement process blocks 502, 602, 801, 902, and 1000, which determine if the first group of game play requests collected by the first collection program code meets the predefined condition for a quorum. If the conditions for a quorum are met, then game program code conducts a bingo game with the first group of game play requests as described in relation to process blocks 507, 514, 702, and 804. While the game program code is conducting the game with the first group of play requests, second collection program code collects a second group of game play requests from the EPSs 103 as illustrated by the flow from process block 506 to both process blocks 500 and 507, and similar concurrent execution paths in FIGS. 5-8. In a preferred embodiment the game program code can begin conducting a second bingo game with the second group of game play requests before the first bingo game is completed.

In one form, the first quorum checking code includes comparison program code for comparing the number of game play requests collected in each respective game play group to a minimum number of game play requests, as discussed in both FIGS. 9 and 10. Preferably, the comparison code implements process blocks 902 and 1000, first using counter program code to count the number of game play requests collected in each respective group of game play requests. As noted earlier with respect to process blocks 502, 702, 602, and 801, the minimum number of game play requests required to produce a quorum may be determined dynamically based on operating conditions. These process blocks can be implemented using dynamic program code included in the quorum checking program code. In various forms the quorum checking program code also includes allocation program code for checking if a queue location has been allocated, as discussed in relation to process block 1002, timer program code for implementing process blocks 901, 902, and 908, receipt check program code to check for a quorum after each game play request is received, as discussed in relation to process block 1000, and linking code for associating game play requests with bingo card representations in association with the steps set out at 400 through 405 in FIG. 4.

Figure 11:
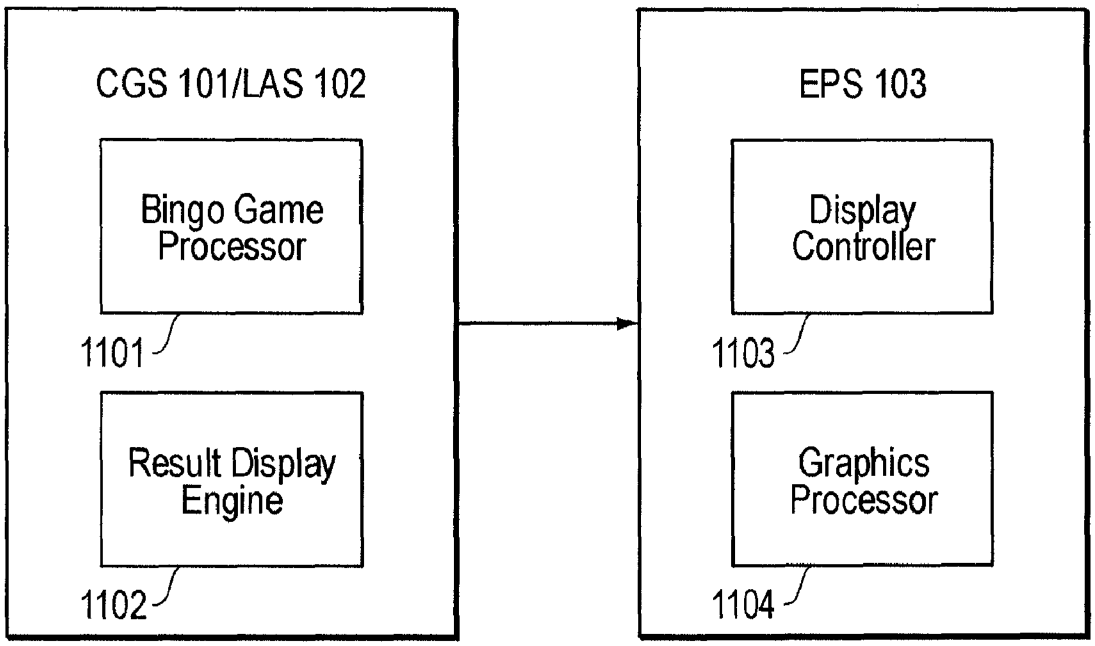
FIG. 11 is a diagrammatic representation of an embodiment of the present invention as implemented with the system shown in FIG. 1.

FIG. 11 may be used to describe the components of one embodiment of the present invention as implemented in connection with gaming system 100. The illustrated gaming system includes bingo game processor 1101, result display engine 1102, display controller 1103, and graphics processor 1104. Bingo game processor 1101 produces, obtains, or identifies a bingo game result for each of a number of game play requests in each bingo game conducted through the system. Result display engine 1102 defines a common graphic display that represents or shows a number of bingo game results. Each common graphic display defined by result display engine 1102 may be used to present multiple results to a given player simultaneously. The apparatus shown in FIG. 11 uses display controller 1103 in conjunction with graphics processor 1104 to cause a display device (such as display 305 in FIG. 3) associated with an EPS 103 to present graphics for the respective common graphic display.

The functions performed by bingo game processor 1101 preferably take place at either a respective CGS 101 or a respective LAS 102 in system 100 shown in FIG. 1. Bingo game processor 1101 may be implemented through one of processors 200 in FIG. 2 or could be implemented as a separate processing device included in or associated with the respective CGS 101 or LAS 102. In a preferred embodiment, bingo game processor 1101 identifies bingo game results for a number of respective bingo game plays as described above in connection with FIGS. 5-8. However, bingo game processor 1101 is not limited to identifying bingo game results according to any particular method. Rather, any suitable method can be used to identify the bingo game results according to the present invention.

In the embodiment of the invention shown in FIG. 11, bingo game processor 1101 sends bingo game results for a related group of game play requests for a particular player to result display engine 1102 which then defines a particular common graphic display. According to this embodiment of the invention, result display engine 1102 may define a common graphic display by selecting a respective result representation for each bingo game result and including each respective result representation in the common graphic display. Alternatively, result display engine 1102 may define the common graphic display by selecting a graphic display that is consistent with a cumulative result for the related group of game play requests, and without regard to any of the individual bingo game results. It will be noted that in either of these alternatives the common graphic display defined according to the invention is representative of the cumulative result that is obtained by combining the individual bingo game results into a cumulative result value. Examples showing the relationship between the individual bingo game results, cumulative result, and common graphic display will be described below with reference to FIG. 13.

Result display engine 1102 is preferably implemented through the same processing device or system of processing devices that implements bingo game processor 1101, either CGS 101 or a respective LAS 102. However, it is possible that each respective EPS 103 having multiple game result display capabilities according to the invention may separately implement its own result display engine. The processes necessary to implement the functions of result display engine 1102 are described in more detail with respect to FIGS. 12 and 13.

In a preferred form of the invention, each EPS 103 having multiple game result display capability includes a respective display controller 1103 and graphics processor 1104 as shown in FIG. 11. For example, display controller 1103 may be implemented through the EPS processor 300 shown in FIG. 3 and the graphics processor 1104 may be implemented through a separate processing device operatively connected between processor 300 and display 305. Although display controller 1103 and graphics processor 1104 are shown implemented through hardware included with an EPS 103 in FIG. 11, those skilled in the art will appreciate that the functions of the display controller and graphics processor may be performed using any number of hardware arrangements. For example, all of the processing required to produce the signals used to generate the actual images on the display device at an EPS 103 may be performed at some location remote to the particular EPS 103, such as CGS 101 or LAS 102, and communicated to the EPS 103 through a cable or some other signal communication arrangement.

A method according to the invention may be described with reference to the diagram of FIG. 12. In the following description of FIG. 12 it will be appreciated that the references to the physical components are references to the diagrams in FIGS. 1 through 3 and 11 that show those components.

The illustrated process begins with submitting multiple game play requests from a single player station such as an EPS 103 shown in FIG. 1. This step of submitting game play requests is shown at process block 1201 in FIG. 12. It should be noted that some EPSs 103 according to the invention may require players to submit multiple game play requests while other EPSs may allow multiple game play requests to be submitted as an option. Each game play request submitted from an EPS 103 will be associated with a bingo card representation. The above description of FIG. 4 sets out several steps that may occur or be required in the course of submitting a game play request in a bingo system. For example, a player may be required to select a bingo card representation and select a wager amount for each game play request. Alternatively, bingo card selection may be automated so that the player need only select the number of game plays the player desires, and a wager amount may be dictated by the system, selected once by a player for multiple game play requests, or individually selected for each game play request. It should be appreciated that the present invention encompasses any process or procedure at a player station in which a player makes multiple game play requests either simultaneously or incrementally over a period of time. However, it will be appreciated that preferred forms of the invention allow a player to ultimately enter a single input in order to actually submit multiple game play requests simultaneously. For example, a player may make a number of inputs to select the number of game play requests to be submitted and the wagers associated with the game play requests, and then actuate a "play" button to actually submit multiple game play requests simultaneously. Alternatively, different related game play requests may be submitted over a period of time by multiple player inputs. Regardless of how multiple game play requests are submitted, each game play request will, at some point in the system, be associated with a particular bingo card representation and this bingo card representation is used in identifying a result for the respective bingo game play request.

Figure 12:
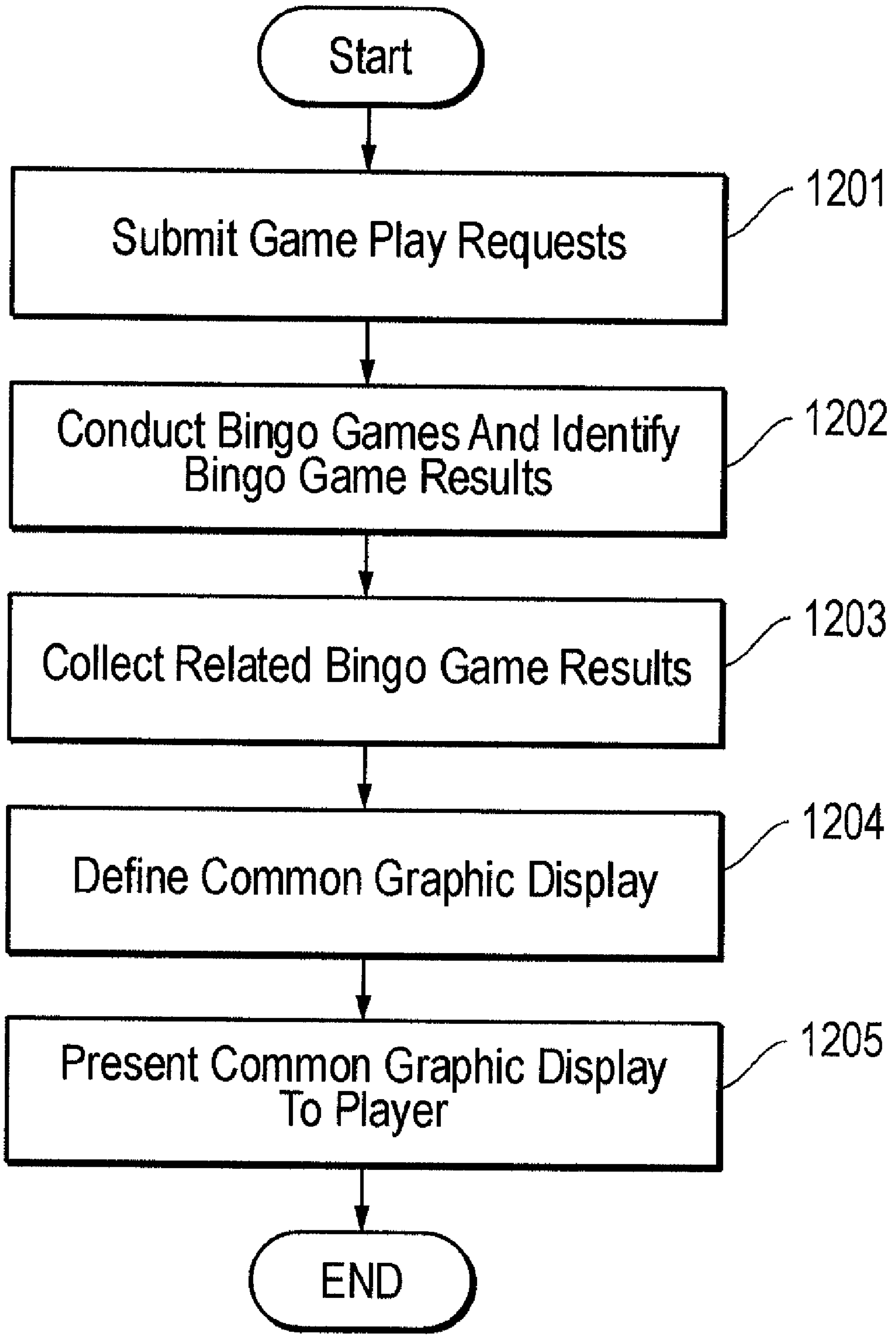
FIG. 12 is a flowchart illustrating a process embodying the principles of the present invention for presenting multiple bingo game results through a common display.

As shown at process block 1202 in FIG. 12, a method according to the present invention also includes conducting one or more bingo games and identifying the corresponding bingo game results for each game play request that was submitted by a player at process block The bingo games may be conducted at a suitable bingo game processor such as CGS 101 or LAS 102 in a manner set out above by grouping together the game play requests submitted from a number of player stations to form a quorum for playing a respective bingo game, obtaining a ball draw, and comparing bingo card representations to the ball draw to identify game winning patterns. It should be noted that the manner in which game play requests are grouped to conduct bingo games may be affected by a player's ability to submit multiple game play requests as indicated at process block 1201. In particular, it may be desirable to ensure that each game play request submitted by a single player according to the present invention is included in a different bingo game conducted by the bingo game processor. In this preferred form of the invention, the bingo game processor or other suitable element performs the added function of separating game play requests submitted by a single player at process block 1201 and groups the different game play requests into different game groups. Other forms of the invention may divide related game play requests from a given player up so that the game play requests are included in at least two different game groups or so that the game play requests from a given player do not form more than a given percentage of the overall number of game play requests in a game group. Yet other forms of the invention may divide related game play requests up so that each game group includes game play requests from at least two different players. It is possible to implement the present invention so that a player submitting, for example, eight game play requests may have all of those game play requests grouped into a single bingo game group and may have a bingo game conducted between those requests. In this example, the player is essentially playing a single bingo game against himself and thus systems that allow this type of grouping preferably require that each game play request be associated with a different bingo card representation. It is further noted that where a player's own game play requests are always grouped into a game group without including any game play requests from other players, the game may be implemented in a stand-alone player station.

As discussed above, a bingo gaming system according to the present invention may require some action by the player at their player station other than simply entering the game play requests in order to enable the player to obtain their results. For example, a player may need to enter a daub input each time a bingo game result is identified for a particular bingo card/game play request. Alternatively, the player may only need to submit one daub input after all of the bingo game results have been identified or an automatic daubing procedure may be implemented. Other forms of the invention may require a player to enter a daub input and a prize claiming input for each group of related game play requests from the player or a daub input and a prize claiming input for each game play request in a group of related game play requests.

Process block 1203 next shows collecting bingo game results for the multiple related game play requests submitted at process block 1201 for or by a given player. In order to collect the related bingo game results, bingo game processor 1101 (FIG. 11) is preferably able to distinguish bingo game results associated with related game play requests from bingo game results that are associated with other game play requests not included in the group submitted at process block 1201. One way of implementing this preferred form of the invention relates to the information included in the game play requests submitted for a particular group at process block 1201. Each game play request in a group submitted by a single player at process block 1201 may be associated with a unique identifier. This identifier is also associated with the respective result identified for the respective game play request and the results may be collected according to the identifier. In some preferred forms of the invention the identifier may include a count of the number of related game play requests submitted at process block 1201. This information may be used by the bingo game processor or other component in the system collecting related bingo game results to identify when all of the results for a given group of related game play requests have been collected.

In the preferred form of the invention shown in FIG. 12, once all of the related bingo game results have been collected, the system defines a common graphic display as indicated at process block 1204. The common graphic display may be defined using a number of different methods performed at result display engine 1102 shown in FIG. 11. In one preferred form of the invention, the common graphic display comprises a representation of a multiple line reel-type machine (slot machine). Each pay line in the display may be used to show a result for a particular one of the game play requests submitted by a player at block 1201 in FIG. 12. Where each pay line in such a display is dedicated to showing a result for a given one of the game play requests, the number of game play requests that may be submitted at process block 1201 is limited by the number of pay lines in the display. However, some forms of the present invention do not require a one-to-one correspondence between the game play requests submitted at block 1201 and pay lines in the combined display. In these forms of the invention, result display engine 1102 shown in FIG. 11 may select graphics to show winning combinations of symbols on a number of pay lines that is less than the number of game play requests submitted at block 1201. The cumulative result indicated by the pay line graphics will equal the total of the individual related bingo game results collected at block 1203. The common graphic display defined at block 1204 in FIG. 12 will be described further below with reference to specific examples shown in FIG. 12. In yet other forms of the invention there may be no correspondence between any individual result for a given game play request and a pay line in a common graphic display. In these forms of the invention, result display engine 1102 simply selects any combination of pay line graphics required to produce a common graphic display to represent the cumulative result for a set of related game play results.

Defining a common graphic display according to the present invention involves processing to identify a common graphic display that meets the given display requirements. For example, in a preferred form of the invention, each potential combination of individual bingo game results is associated in a database with one or more common graphic displays and this data is stored so that it is accessible to the result display engine 1102 in FIG. 11. Once the related bingo game results are collected, the result display engine simply looks up the common graphic display or set of displays that may be used to show those collected results and chooses one of the predefined common graphic displays. This technique of using a database of predefined common graphic displays, each associated with a given combination of potential bingo game results may be used to define a common graphic display for a set of bingo game results regardless of the constraints for showing the various related results. However, at least one common graphic display must be available for each potential combination of results and display constraints.

Process block 1205 shows that the final step in a preferred method according to the invention is presenting the common graphic display to the player who submitted the multiple game play requests at block 1201. This common graphic display presented at block 1205 is the common graphic display defined at block 1204, and is presented to the respective player using a suitable display device at the player's player station (such as display device 305 at EPS 103 shown in FIG. 3). In a preferred form of the invention, the common graphic display is produced on a display device under the control or direction of display controller 1103 and graphics processor 1104 shown in FIG. 11. Display controller 1103 sends suitable graphics instructions and data to graphics processor 1104 which in turn processes the instructions and provides suitable display driving signals to the display device. The display device (display device 305 in FIG. 3, for example) then produces the desired common graphic display.

In preferred forms of the present invention the common graphic display is defined by result display engine 1102 using a representative code rather than an actual graphics definition that could be processed by a suitable graphics processor to drive a display device. In one form of the present invention, for example, a graphic symbol or component of a common graphic display, or even an entire common graphic display, will be represented by a code. The code or codes for the common graphic display forms a definition for the display which may be communicated to display controller 1103. Display controller 1103 may then access a local data storage device to locate the actual graphics data and instructions associated with each code and directs graphics processor 1104 to process the data and produce the signals required to drive the player's display device. This preferred arrangement of communicating the common graphic display definition from result display engine 1102 to the player station in the form of one or more display definition codes minimizes the amount of data that must be transferred to the player station to cause the desired graphic to be displayed, and this minimization of data is beneficial particularly where the result display engine and player station are separated over a network. However, it will be appreciated that it is possible for the result display engine 1102 to actually generate the stream of data necessary for directing a display device to produce the desired common graphic display. In forms of the invention that use the result display engine 1102 to generate the graphics instructions and data, display controller 1103 may be omitted. Even graphics processor 1104 may be omitted at a player station if the result display engine is capable of generating the actual display driving signal.

Figure 13:
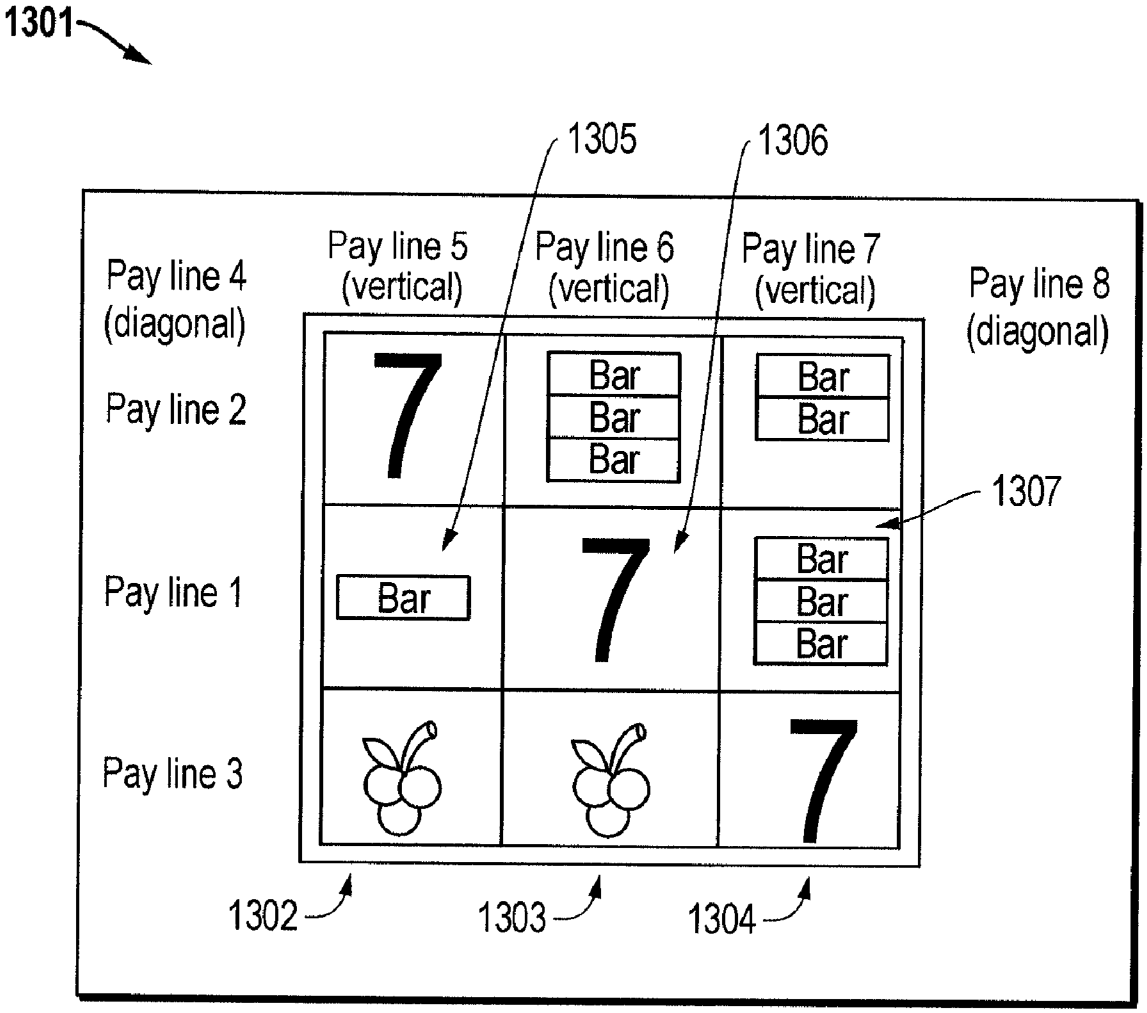
FIG. 13 is a representation of a common graphic display that may be used to communicate a cumulative result to a player according to the present invention.

FIG. 13 provides an example of a graphical representation that may be used to display multiple bingo game results to a player according to one embodiment of the present invention. The common graphic display 1301 shown in FIG. 13 comprises a reel-type or slot machine-type display having a two-dimensional matrix of graphic symbol locations. Each graphic symbol location is occupied by a graphic symbol, which in this example includes a "7," a bar symbol (single, double, and triple bar), or a "cherries" symbol. In common graphic display 1301, a series of three reel representations 1302, 1303, and 1304 correspond to the reels of a reel-type game (slot machine-type game) and are represented as having various graphic symbols at three adjacent reel locations aligned vertically. This results in a three-by-three matrix of graphic symbol locations that may be used to define eight different linear, three-symbol pay lines. These pay lines are shown as pay lines 1 through 8 in FIG. 13. This common graphic display may be generated at a player station such as an EPS 103 shown in FIG. 1 where a player may enter a number of related game play requests. As in all reel-type games, a pay table correlates a prize with a set of symbols that may appear along a pay line. For example, a pay table may define the set of symbols at pay line 4, that is, three "7s" in a row as winning or paying 50 credits. The symbols "cherries," "cherries," "7" as aligned along pay line 3 may be defined as winning or paying 5 credits, for example. The rest of the symbol sets along the other pay lines in FIG. 13 may be associated with no prize.

It should be borne in mind that common graphic display 1301 shown in FIG. 13 is defined in the preferred form of the invention by a suitable processing device such as result display engine 1102 shown in FIG. 11 in the process described with reference to process block 1204 in FIG. 12. Thus, although the example common graphic display shown at FIG. 13 appears to be a slot machine-type display, the displayed graphic symbols are dictated ultimately by the bingo game results for a number of different bingo game play requests submitted by a player.

In one embodiment of the present invention, the bingo game result associated with each game play request in a set of related requests entered by a player as shown at block 1201 in FIG. 12 may be shown as a result representation at one of the pay lines shown in the example of FIG. 13. This embodiment limits the number of bingo game results that may be displayed at common graphic display 1301 to eight different results. Using the example reel stop positions shown in FIG. 13, the bingo game result displayed for a first game play request corresponds to the result representation at pay line 1, "single bar, 7, triple bar." The bingo game result for a second game play request submitted by the player in the bingo gaming system is shown by the representation at pay line 2, with the symbols "7, triple bar, double bar." Pay line 3 shows the result representation "cherries, cherries, 7"; pay line 4 shows the result representation "7, 7, 7"; pay line 5 shows the result representation "7, single bar, cherries"; pay line 6 shows the result representation "triple bar, 7, cherries"; pay line 7 shows the result representation "double bar, triple bar, 7"; and finally, pay line 8 shows the result representation "double bar, 7, cherries."

It will be appreciated from the common graphic display 1301 in FIG. 13 that the result representation shown at a given pay line may affect the result representation shown at another pay line. The result representations at the various pay lines must be consistent in order to properly reflect the bingo game results associated with a number of game play requests making up a related group of game play requests as submitted at block 1201 in FIG. 12. The different types of result representations for showing each different bingo game result are selected so that for any possible mix of bingo game results, at least one solution exists to show all of the corresponding result representations on the common graphic display. For example in the illustration shown in FIG. 13, if the player has made eight game play requests with the bingo game result of the different game play requests represented at pay lines 1 through 8, the result representation at pay line 1 affects the result representations corresponding to each of the other pay lines. That is, the result representation shown at pay line 1 is made up of reel-type graphic symbols that are also necessarily included in each of the other pay lines 2 through 8. In the illustrated example of reel stop positions, the reel symbol "single bar" at position 1305 comprises the first graphic symbol in the result representation in pay line 1 and the second graphic symbol in the result representation at pay line 2. Similarly, the reel symbol "7" shown at position 1306 comprises the second graphic symbol in pay lines 1, 4, 6, and 8, and the reel symbol "triple bar" shown at position 1307 comprises the last graphic symbol in pay line 1 and the second graphic symbol in pay line 7.

In order to ensure that the result representations at the various pay lines in display 1301 are consistent in forms of the invention in which each line must show a respective bingo game result, the present invention may define a number of equivalent result representations to display the same bingo game result for a respective game play request. For example, a straight line bingo may be represented by the symbol sequence "cherries, cherries, any symbol" where the "any symbol" may be any of the available graphic symbols in the game presentation. Thus, the bingo game result associated with pay line 3 in FIG. 13 achieved a straight line bingo during a particular bingo game, and the common graphic display shows "cherries, cherries, 7" along pay line 3 in order to be consistent with the result which is shown along pay line 4, the symbol sequence "7, 7, 7" in this example.

In order to provide more flexibility in defining common graphic displays such as 1301 where the result represented along one pay line affects one or more other pay lines, each pay line may be used to represent the result associated with an undefined one of the game play requests. In this form of the invention the result for a first bingo game play request may be shown at any of the pay lines.

In another embodiment of the present invention, the common graphic display may not be constrained to show any of the individual bingo game results, but only show a graphic that is consistent with the cumulative result for the different results for a related group of game play requests submitted at block 1201 in FIG. 12. In these forms of the present invention, the element in the system that defines the common graphic display need only receive a cumulative result or representation of a cumulative result for a related group of game play requests. The element responsible for defining the common graphic display, such as result display engine 1102 in FIG. 11, may have access to a database that correlates each potential cumulative result that may be achieved with some group of related game play requests with one or more, and preferably many different common graphic displays that provide a graphic representation (a cumulative result representation) of the respective cumulative result. The common graphic display may then be defined by querying the database with the given cumulative result to identify one or more common graphic displays that show that cumulative result and selecting one of those common graphic displays. As discussed above, the common graphic display is preferably represented by a code or series of codes which is communicated from the display defining element such as result display engine 1102 to the system components responsible for producing the actual graphic display at the respective player station (display controller 1103, graphics processor 1104, and the player station display device in the above described example).

An example of an embodiment of the invention using only a cumulative result may be described using the example result display 1301 shown in FIG. 13. For purposes of this example, again assume that the relevant pay table defines the symbol sequence "7, 7, 7" as winning 50 credits and the symbol sequence "cherries, cherries, any symbol" as winning 5 credits, and that none of the other symbol combinations correlate to any credit win level. Thus, the common graphic representation 1301 correlates to a cumulative result of 55 credits. Now for purposes of this example, assume that a straight line bingo result entitles the player achieving that pattern to 5 credits, a "T" pattern entitles a player achieving that pattern to 20 credits, and an "H" pattern entitles a player achieving that pattern to 30 credits. Further assume that a player enters six game play requests in a gaming system according to the invention as described above with reference to block 1201 in FIG. 12, and achieves a straight line bingo for one game play request, a "T" pattern for one game play request, a "H" pattern for another game play request, and no other winning patterns for the remaining three game play requests the player entered. Once these results are collected as indicated at block 1203 in FIG. 12, it will be known that the cumulative result for the six related game play requests correlates to 55 credits. The results or the cumulative result may then be communicated to the component in the present system responsible for defining the common graphic display such as result display engine 1102 in FIG. 11. This element may then select a common graphic display that correlates to that 55 credit value such as the display 1301 shown in FIG. 13. As mentioned above, each potential cumulative result is preferably correlated to a number of equivalent common graphic displays so that the same graphic display is not used every time a given cumulative result is achieved. The equivalent common graphic displays may be selected at random or in any suitable manner.

In the example set out in the previous paragraph, the number of actual bingo game results is higher than the winning pay lines (winning result representations) shown in the common graphic display. The invention is by no means limited to this situation. Rather, the number of winning bingo game results could be lower than the number of winning pay lines shown on the common graphic display, or the number of winning bingo game results could be the same as the number of winning pay lines shown in the common graphic display. It will further be noted that where there need not be a one-to-one correspondence between game play requests/bingo game results and pay lines/result representations, a player may enter more game play requests as indicated at block 1201 in FIG. 12 than there are result representations in the common graphic display. That is, even though the example common graphic display 1301 in FIG. 13 shows eight pay lines, the common graphic display could be used to show a cumulative result for nine or more game play requests.

Figure 14:
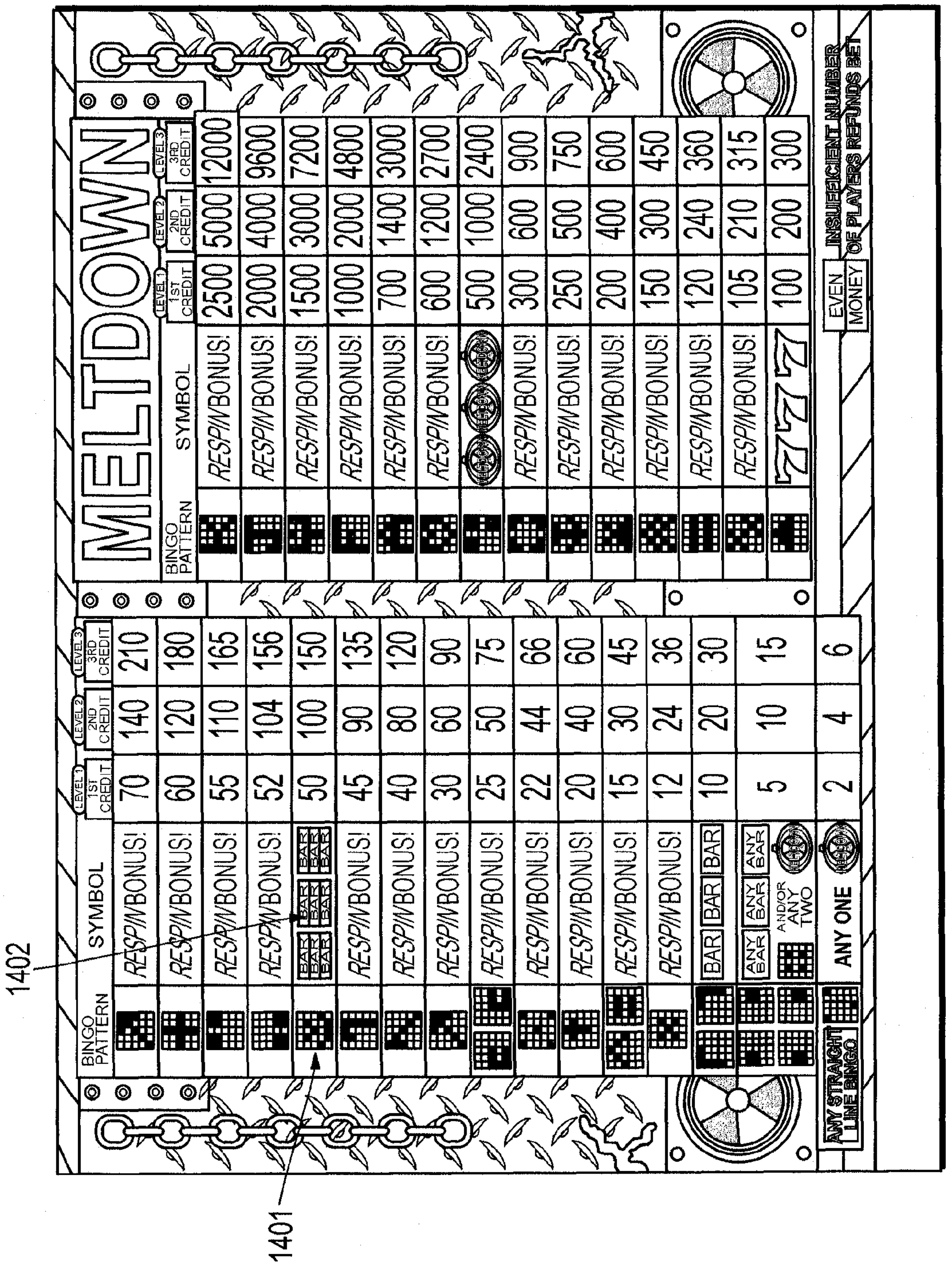
FIG. 14 is a representation of a payout table that may be used for a bingo game played through the gaming system shown in FIG. 1.
Figure 15:
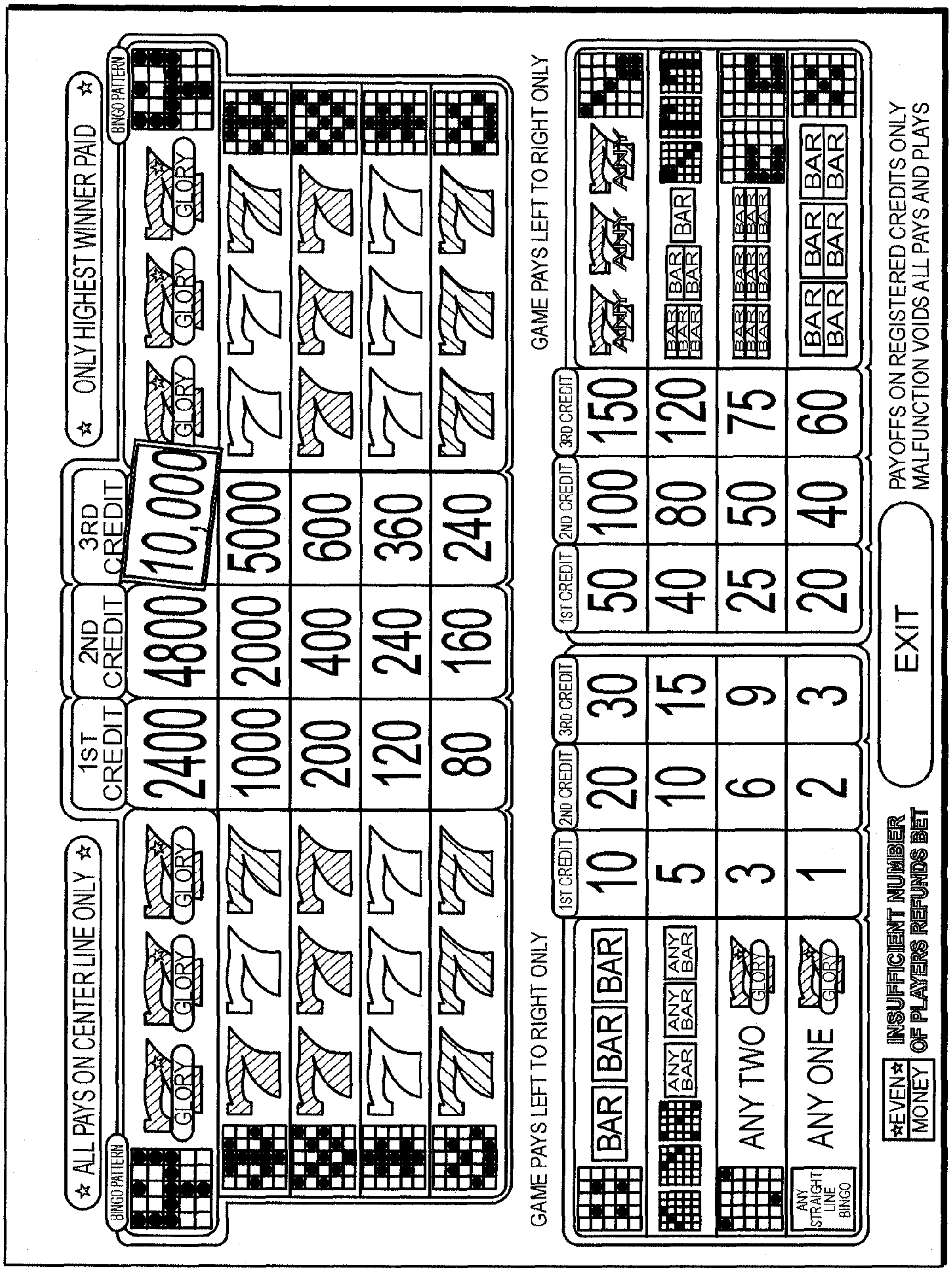
FIG. 15 is a representation of an additional payout table that may be used for a bingo game played through the gaming system shown in FIG. 1.

FIGS. 14 and 15 show examples of payout tables (also referred to as "pay tables") that may be used in displaying results of bingo games administered through the present gaming system. These payout tables are each associated with a specific type of reel-type game display or presentation. It will be noted that each prize level is associated with one or more bingo patterns that are each mapped or associated to that prize level. The payout table also shows the reel stop positions (which may also be referred to as pay line symbol combinations) that are associated with each prize level/bingo pattern set when aligned along a pay line of the reel-type display. For example, the prize level 1401 of the payout table shown in FIG. 14 is associated with a "smiling face" bingo pattern, a pay line symbol combination 1402 of three "triple bar" symbols, and a prize value of 50 credits for a 1 credit wager, 100 for a two credit wager, and 150 for a three credit wager. If participating in the system 100 through an EPS 103 implementing the illustrated game presentations, achieving a particular bingo pattern in the gaming system will be shown on the EPS by a reel stop arrangement corresponding to the particular bingo pattern. Referring again to prize level 1401 in FIG. 14, if a player achieves the "smiling face" pattern for a game play request entered through an EPS 103 implementing a game presentation using the pay table shown in FIG. 14, the display device (305 in FIG. 3) at the EPS would show that bingo result as a reel-type display with the pay line symbol combination "triple bar," "triple bar," and "triple bar" (pay line symbol combination 1402). This reel-type display is preferably in addition to an actual bingo card display also shown at the EPS 103 either simultaneously or otherwise. Continuing with the example of prize level 1401 in FIG. 14, the player achieving the "smiling face" pattern in the bingo game would also be awarded 50 credits if the wager associated with the game play request was a 1 credit wager, 100 credits if their wager was 2 credits, and 150 credits if their wager was 3 credits.

It will be noted that the various EPSs 103 included in gaming system 100 shown in FIG. 1 may each be adapted for a particular display or presentation, and that the system may host many different types of game presentations. For example, a single system 100 may include EPSs 103 adapted to provide the display indicated by the payout table in FIG. 14 while other EPSs in the system may be adapted to provide the display indicated by the payout table in FIG. 15. All of these EPSs 103 submit game play requests for the very same bingo games. That is, a bingo game played according to the present invention may be played with, for example, seven game play requests originating from EPSs 103 adapted to provide the display indicated in the payout table shown in FIG. 14 and eight game play requests originating from EPSs 103 adapted to provide the display indicated in the payout table shown in FIG. 15. This multiple game presentation arrangement is facilitated by requiring the same game ending pattern for each EPS 103, regardless of the presentation it may provide. The bonus prizes available in the bingo game and the patterns that provide those bonus prizes may vary dramatically from one game presentation, that is, one EPS 103, to the next. Thus, in a particular bingo game played through system 100, the prize awarded to a particular bingo pattern achieved for a game play request will depend upon the particular EPS 103 from which the game play request originated. Furthermore, game play requests at different buy in levels may all participate in the same bingo games. For example, a given bingo game according to the present invention may be played by five players at a one credit buy in level, six players at a two credit buy in level, and four players at a three credit buy in level.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised Sep. 2007), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the invention.

The invention claimed is:

1. A method including:

(a) collecting a respective game play request from each of a number of different player stations in a bingo gaming system, each game play request being associated with a respective bingo card representation and a wager;

(b) determining if the collected game play requests meet a predefined condition for a quorum to conduct a bingo game;

(c) in the event the collected game play requests do not meet the predefined condition for a quorum to conduct a bingo game, communicating an even money result to each player station from which a respective one of the game play requests was collected; and (d) in response to the communication of the even money result, displaying at the respective player station a bingo gaming system result which pays the amount of the wager associated with the respective game play request.

2. The method of claim 1 further including displaying at the respective player station a notice indicating that the displayed bingo gaming system result was not achieved in the play of a bingo game.

3. The method of claim 1 further comprising modifying the predefined condition for the quorum dynamically according to conditions in a host gaming system.

4. The method of claim 3 further comprising modifying the predefined condition for the quorum dynamically by decreasing the number of players to form a quorum during light activity in the host gaming system.

5. The method of claim 4 further comprising modifying the predefined condition for the quorum dynamically by increasing the number of players to form a quorum during heavy activity in the host gaming system.

6. The method of claim 1 further comprising modifying the predefined condition for the quorum dynamically according to the nature of the game play requests that have been received.

7. The method of claim 6 in which modifying the predefined condition for the quorum dynamically according to the nature of the game play requests that have been received further comprises making the modification based at least in part on the payouts available in the bingo game.

8. The method of claim 6 in which modifying the predefined condition for the quorum dynamically according to the nature of the game play requests that have been received further comprises making the modification based at least in part on the permissible delay between the time a player makes a game play request and the time that results are available to be displayed to the player in response to a game play request.

* * * * *